(12) United States Patent
Stephan et al.

(10) Patent No.: US 10,289,967 B2
(45) Date of Patent: May 14, 2019

(54) CUSTOMER-BASED INTERACTION OUTCOME PREDICTION METHODS AND SYSTEM

(71) Applicant: Mattersight Corporation, Chicago, IL (US)

(72) Inventors: Alain Stephan, Glenview, IL (US); Douglas Brown, Austin, TX (US); Christopher Danson, Austin, TX (US); David Gustafson, Lake Bluff, IL (US)

(73) Assignee: MATTERSIGHT CORPORATION, Chicago, IL (US)

( * ) Notice: Subject to any disclaimer, the term of this patent is extended or adjusted under 35 U.S.C. 154(b) by 0 days.

(21) Appl. No.: 13/782,522

(22) Filed: Mar. 1, 2013

(65) Prior Publication Data
US 2014/0249872 A1 Sep. 4, 2014

(51) Int. Cl.
*G06Q 10/00* (2012.01)
*G06Q 10/06* (2012.01)
(Continued)

(52) U.S. Cl.
CPC ..... *G06Q 10/063* (2013.01); *G06Q 10/06375* (2013.01); *G06F 17/20* (2013.01); *G06F 17/2785* (2013.01)

(58) Field of Classification Search
CPC ... G06F 17/20; G06F 17/2785; G06Q 10/063; G06Q 10/06375
(Continued)

(56) References Cited

U.S. PATENT DOCUMENTS 6,798,876 B1 9/2004 Bala
7,519,566 B2 * 4/2009 Prigogin ............... G06Q 10/06
706/21
(Continued)

OTHER PUBLICATIONS

Mattersight corporation; researchers submit patent application, "customer-based interaction outcome prediction methods and system", for approval. (Sep. 23, 2014). Journal of Mathematics Retrieved from https://search.proquest.com/docview/1562446809?accountid= 14753 (Year: 2014).*
(Continued)

*Primary Examiner* — Folashade Anderson
(74) *Attorney, Agent, or Firm* — Haynes and Boone, LLP

(57) ABSTRACT

A method for customer-based outcome prediction that includes receiving recordings of interactions with customers in a customer group, analyzing the recordings of the interactions to generate interaction data, and building a predictive model using the interaction data, the predictive model identifying a variable relevant to predicting a likelihood of an identified outcome occurring in association with future interactions with customers in the customer group. The method also includes receiving a recording of a current interaction with a first customer, the first customer being in the customer group and analyzing the recording of the current interaction with the first customer to generate current interaction data. Further, the method includes adding the current interaction data to a first customer profile associated with the first customer and applying the predictive model to the first customer profile to predict the likelihood of the identified outcome occurring in association with the current interaction.

19 Claims, 7 Drawing Sheets

(51) Int. Cl.
*G06F 17/27* (2006.01)
*G06F 17/20* (2006.01)

(58) Field of Classification Search
USPC .............................................. 705/7.11–7.42
See application file for complete search history.

(56) References Cited

U.S. PATENT DOCUMENTS

| | | | |
|---|---|---|---|
| 7,707,059 B2* | 4/2010 | Reed | G06Q 10/0637 705/7.31 |
| 7,725,300 B2* | 5/2010 | Pinto | G06Q 30/0201 703/2 |
| 7,848,909 B2 | 12/2010 | Kraiss | |
| 8,001,044 B2* | 8/2011 | Davis | G06Q 30/0254 705/14.53 |
| 8,005,753 B2 | 8/2011 | Davis | |
| 8,504,408 B2 | 8/2013 | Banthia et al. | |
| 8,676,586 B2* | 3/2014 | Wasserblat | G10L 15/18 704/270 |
| 8,751,273 B2 | 6/2014 | Pinto et al. | |
| 8,867,733 B1* | 10/2014 | Conway | H04M 3/5233 379/265.11 |
| 8,914,285 B2 | 12/2014 | Wasserblat et al. | |
| 9,015,046 B2* | 4/2015 | Pereg | G06Q 10/063 379/265.01 |
| 9,269,374 B1* | 2/2016 | Conway | G06K 9/00302 |
| 9,805,128 B2* | 10/2017 | Albert | G06F 17/30867 |
| 9,894,205 B1* | 2/2018 | Miller | H04M 3/5175 |
| 2002/0072921 A1* | 6/2002 | Boland | G06Q 30/02 709/206 |
| 2002/0087385 A1* | 7/2002 | Vincent | G06Q 10/10 705/7.29 |
| 2004/0098274 A1* | 5/2004 | Dezonno | H04M 3/523 706/21 |
| 2004/0143473 A1* | 7/2004 | Tivey | G06Q 30/02 705/1.1 |
| 2005/0154687 A1* | 7/2005 | Kraiss | G06N 7/00 706/12 |
| 2006/0265090 A1 | 11/2006 | Conway et al. | |
| 2009/0222313 A1 | 9/2009 | Kannan et al. | |
| 2009/0234684 A1* | 9/2009 | Stoke | G06Q 10/0635 705/7.36 |
| 2010/0017263 A1 | 1/2010 | Zernik et al. | |
| 2010/0054453 A1 | 3/2010 | Stewart | |
| 2010/0332287 A1* | 12/2010 | Gates | G06F 17/277 705/7.32 |
| 2011/0249811 A1 | 10/2011 | Conway et al. | |
| 2011/0251874 A1 | 10/2011 | Banthia et al. | |
| 2012/0076283 A1 | 3/2012 | Ajmera et al. | |
| 2012/0101867 A1* | 4/2012 | Zgardovski | G06Q 10/06311 705/7.15 |
| 2012/0284080 A1* | 11/2012 | De Oliveira | H04W 4/21 705/7.29 |
| 2013/0218616 A1* | 8/2013 | Pinchuk | G06Q 10/10 705/7.11 |
| 2014/0012626 A1* | 1/2014 | Ajmera | G06Q 10/10 705/7.31 |
| 2014/0143018 A1* | 5/2014 | Nies | G06Q 30/0201 705/7.32 |
| 2014/0222506 A1 | 8/2014 | Frazer et al. | |
| 2014/0244354 A1* | 8/2014 | Seifert | G06Q 30/0202 705/7.31 |
| 2014/0249873 A1 | 9/2014 | Stephan et al. | |
| 2017/0111509 A1* | 4/2017 | McGann | H04M 3/5233 |

OTHER PUBLICATIONS

Kristof Coussement et al., "Improving Customer Attrition Prediction by Integrating Emotions from Client/Company Interaction Emails and Evaluating Multiple Classifiers," Universitet Gent, Working Paper, 2008/527, Jul. 2008, pp. 1-32.
U.S. Appl. No. 14/049,152, filed Oct. 8, 2013, Stephan et al.

* cited by examiner

CUSTOMER-BASED INTERACTION OUTCOME PREDICTION METHODS AND SYSTEM

TECHNICAL FIELD

The present disclosure relates generally to a method and system for analyzing electronic communications, and, more particularly, to a method and system for customer-based interaction outcome prediction.

BACKGROUND OF THE DISCLOSURE

Traditionally, contact centers facilitate the receipt, response and routing of incoming customer communications such as telephone calls, emails, and instant messaging sessions relating to customer service, retention, and sales. Generally, a customer is in contact with a customer service representative ("CSR"), also referred to as a contact center agent, who is responsible for answering the customer's inquiries and/or directing the customer to the appropriate individual, department, information source, or service as required to satisfy the customer's needs. Further, upon contacting a contact center, the customer may also enter into an automated self-service system such as, for example, an interactive voice response ("IVR") system. In an IVR system, the customer interacts with the IVR system directly to conserve human resources.

Often, contact centers monitor calls between a customer and the CSR. Accordingly, contact centers sometimes employ individuals responsible for listening to the conversation between the customer and the agent. Many companies have in-house call centers to respond to customer complaints and inquiries. While monitoring of such calls may occur in real time, it is often more efficient and useful to record the call for later review and other purposes. Information gathered from such calls is typically used to monitor the performance of the call center agents to identify possible training needs. Based on the subsequent review and analysis of the conversation, a monitor can make suggestions or recommendations to improve the quality of the customer interaction. Additionally, in contact center environments, it may be common to collect relevant data relating to customers, such as biographical data and purchase history data.

Conventionally, collected demographic data may be used to predict the likelihood of certain outcomes, such as whether customers will purchase specific items. Because customers are interacting with CSRs through new and different communication channels, data collected about a customer and data recorded during a customer interaction is becoming more diverse. As a result, predictions about customer actions have become less accurate. Further, outcome predictions are often based on data collected during a single interaction and thus may not be as accurate as they could be with respect to customers in identifiable groups. Accordingly, while existing contact center prediction systems and methods have been generally adequate for their intended purposes, they have not been entirely satisfactory in all respects. The apparatuses and methods described herein advantageously may overcome one or more of the deficiencies in conventional systems.

SUMMARY

The present disclosure encompasses a first embodiment related to a method for customer-based outcome prediction. The method includes receiving recordings of past interactions with customers in a customer group, analyzing the recordings of the past interactions to generate past interaction data, and building a predictive model using the past interaction data associated with the customers in the customer group, the predictive model identifying a variable relevant to predicting a likelihood of an identified outcome occurring in association with one or more future interactions with customers in the customer group. The method also includes receiving a recording of a current interaction with a first customer, the first customer being in the customer group and analyzing the recording of the current interaction with the first customer to generate current interaction data associated with the identified variable. Further, the method includes adding the current interaction data to a first customer profile associated with the first customer and applying the predictive model to the first customer profile to predict the likelihood of the identified outcome occurring in association with the current interaction.

In one embodiment, the first customer profile includes biographical data about the first customer. In another embodiment, the past interaction data includes behavioral assessment data about the customers in the customer group. In yet another embodiment, the behavioral assessment data includes personality type data generated by applying a linguistic-based behavioral algorithm to unstructured data recorded during the past interactions. In a further embodiment, the current interaction is selected from one of a telephone-based interaction, an internet-based interaction, an instant message interaction, a social media interaction, a website-based interaction, an email exchange interaction, and a facsimile-based interaction.

In a second aspect, present disclosure encompasses a customer-based interaction outcome prediction system. The system includes an analytics system comprising a processor and a computer-readable medium operably coupled thereto, the computer-readable medium comprising a plurality of instructions stored therein that are accessible to, and executable by the processor. The plurality of instructions includes instructions, that when executed, analyze recordings of past interactions with customers in a customer group to generate past interaction data and instructions, that when executed, build a predictive model using the past interaction data associated with the customers in the customer group, the predictive model identifying a variable relevant to predicting a likelihood of an identified outcome occurring in association with one or more future interactions with customers in the customer group. The plurality of instructions also includes instructions, that when executed, analyze a recording of a current interaction with a first customer to generate current interaction data associated with the identified variable, the first customer being in the customer group. Further, the plurality of instructions includes instructions, that when executed, add the current interaction data to a first customer profile associated with the first customer and instructions, that when executed, apply the predictive model to the first customer profile to predict the likelihood of the identified outcome occurring in association with the current interaction.

In one embodiment, the first customer profile includes biographical data about the first customer. In another embodiment, the past interaction data includes behavioral assessment data about the customers in the customer group. In yet another embodiment, the behavioral assessment data includes personality type data generated by applying a linguistic-based behavioral algorithm to unstructured data recorded during the past interactions. In a further embodiment, the current interaction is selected from one of a telephone-based interaction, an internet-based interaction, an instant message interaction, a social media interaction, a website-based interaction, an email exchange interaction, and a facsimile-based interaction.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION OF PREFERRED EMBODIMENTS

Figure 1:
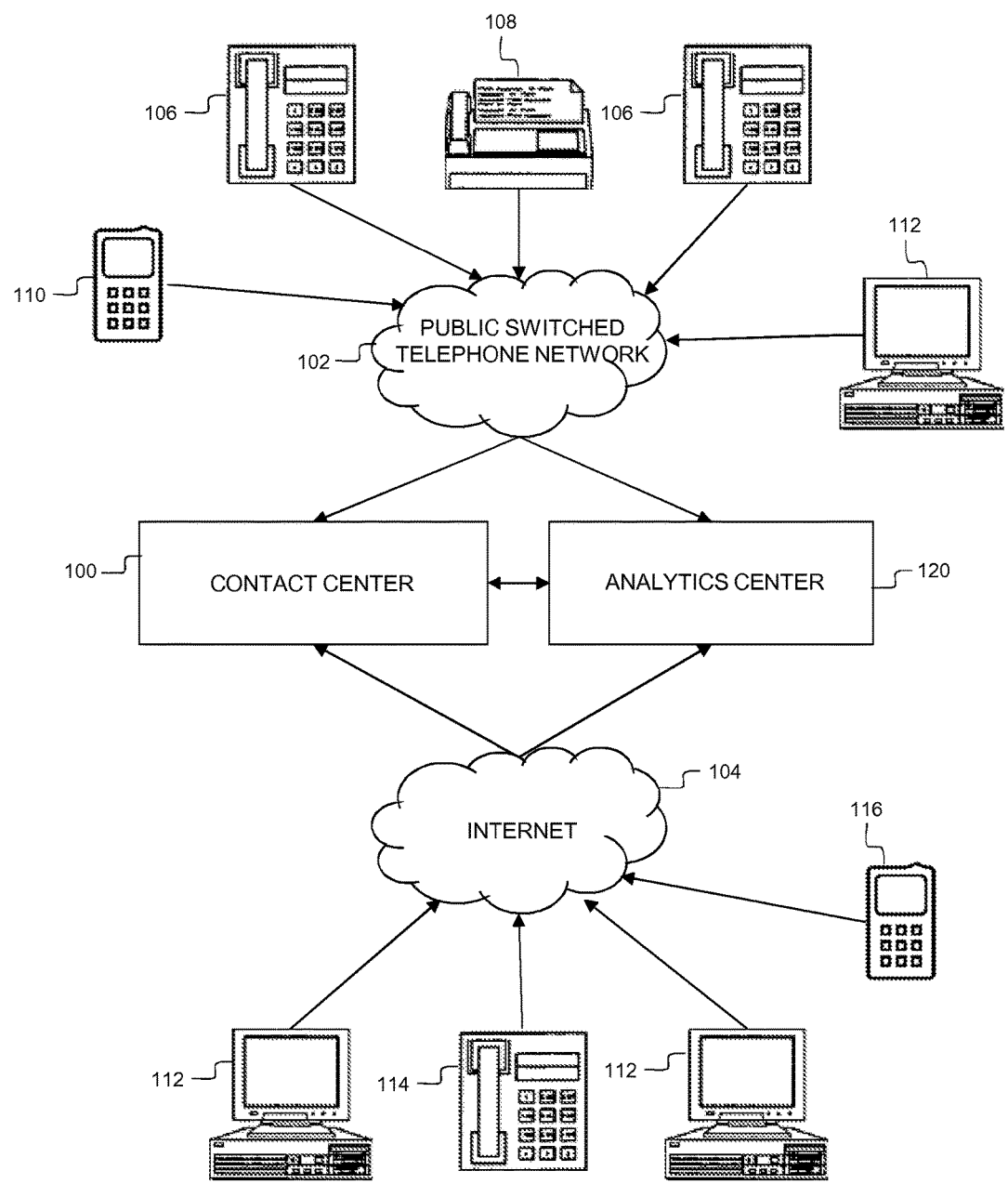
FIG. 1 is a simplified block diagram of an embodiment of a contact center according to various aspects of the present disclosure.

For the purposes of promoting an understanding of the principles of the present disclosure, reference will now be made to the embodiments illustrated in the drawings, and specific language will be used to describe the same. It is nevertheless understood that no limitation to the scope of the disclosure is intended. Any alterations and further modifications to the described devices, systems, and methods, and any further application of the principles of the present disclosure are fully contemplated and included within the present disclosure as would normally occur to one of ordinary skill in the art to which the disclosure relates. In particular, it is fully contemplated that the features, components, and/or steps described with respect to one embodiment may be combined with the features, components, and/or steps described with respect to other embodiments of the present disclosure. For the sake of brevity, however, the numerous iterations of these combinations will not be described separately.

FIG. 1 is a simplified block diagram of an embodiment of a contact center 100 according to various aspects of the present disclosure. A "contact center" as used herein can include any facility, entity, or system suitable for originating, receiving, and/or recording electronic or written communications with customers through multiple different communication channels. Such communication channels can include, for example, the telephone system, the Internet, the postal system, face-to-face meetings, and any other suitable communication channel. Various specific types of communications contemplated through one or more of these channels include, without limitation, telephone calls, facsimile transmissions, voice over IP ("VoIP") calls, video conferences, pre-recorded video clips, written essays or other texts, in-person meetings, internet-based interactions, email, SMS data (e.g., texts), tweets, instant messages, web-form submissions, smartphone app interactions, social media data, and web content data (including but not limited to internet survey data, blog data, microblog data, discussion forum data, and chat data), etc. In various aspects, real-time communication, such as voice, video, or both, is preferably included. It is contemplated that these communications may be transmitted by and through any type of telecommunication device and over any medium suitable for carrying data. For example, the communications may be transmitted by or through telephone lines, cable, or wireless communications. As shown in FIG. 1, the contact center 100 of the present disclosure is adapted to record varying communications and data formats that represent an interaction that may occur between a customer (or caller) and a contact center agent during fulfillment of a customer and agent transaction. A "customer" as used herein can include any person, company, entity, or group. For example, a customer may be a person seeking technical support, a person taking a telephonic survey, a person ordering a product through a web site, a job applicant submitting a video interview, a person applying for enrollment at a institute of higher education, a marketing team participating in a video conference, or any other person or group engaged in unilateral or reciprocal communication. Additionally, an agent may be a person, group, computer system, computer software, or other entity capable of receiving, initiating, or participating in communications.

In the illustrated embodiment, customers may communicate with agents associated with the contact center 100 via multiple different communication networks such as a public switched telephone network (PSTN) 102 or the Internet 104. For example, a customer may participate in an interaction session through traditional telephones 106, a fax machine 108, a cellular (i.e., mobile) telephone 110, a personal computing device 112 with a modem, or other legacy communication device via the PSTN 102. Further, the contact center 100 may accept or initiate internet-based interaction sessions from personal computing devices 112, VoIP telephones 114, and internet-enabled smartphones 116 and personal digital assistants (PDAs). The contact center 100 may proactively initiate customer interactions through any of the aforementioned communication mechanisms. An "interaction" as used herein may include reciprocal communications between a customer and an agent, but also may include unilateral communications to or from a customer. For example, an interaction may consist of a customer discussing a product defect with an agent, or may consist of a customer submitting an email, essay, voice mail, enrollment application, or video clip with or without an expectation of a reply. Further, an interaction may span minutes, hours, days, weeks, months, or any other length of time, with any amount of time between responses of the interacting parties. Additionally, a single interaction may encompass communications on multiple, different channels. For instance, a customer may email a company with a complaint and receive a telephone call in return.

Often, in contact center environments such as contact center 100, it is desirable to predict the likelihood of some specific outcome occurring in association with a customer interaction, be it a telephone-based interaction, a web-based interaction, or other type of electronic interaction over the PSTN 102 or Internet 104. For example, it may be useful for a company to predict during or after a customer interaction the probability of whether the customer will cancel his or her service after the completion of the call. If customer attrition is predicted, the agent on the call may be proactive in mitigating customer dissatisfaction, either in all circumstances or for customers meeting one or more pre-defined criteria. Traditionally, limited categories of customer data are used to create predictive models. As a result, such models tend not to be as accurate as possible because of limited data inputs and because of the heterogeneous nature of interaction data collected across multiple different communication channels. As will be described in more detail in association with FIGS. 2-5, systems associated with the contact center 100 of the present invention preferably use standardized multi-channel customer interaction data and other structured data for prediction of outcomes associated with a customer either during or after a most recent interaction. Further, as will be described in more detail in association with FIG. 7, systems associated with the contact center 100 of the present invention may also aggregate historical biographical and multi-channel interaction data associated with groups of customers and predict interaction outcomes on a customer level. As one of ordinary skill in the art would recognize, the illustrated example of communication channels associated with a contact center 100 in FIG. 1 is just an example, and the contact center may accept customer interactions through various additional and/or different devices and communication channels whether or not expressly described herein.

For example, in some embodiments, internet-based interactions and/or telephone-based interactions may be routed through an analytics center 120 before reaching the contact center 100 or may be routed simultaneously to the contact center and the analytics center (or even directly and only to the contact center). In some instances, the analytics center 120 is a third-party analytics company that captures multi-channel interaction data associated with the contact center 100 and applies predictive analytics to the data to generate actionable intelligence for the contact center. For example, the analytics center 120 may predict the likelihood of some specific outcome occurring in association with a customer interaction. Also, in some embodiments, internet-based interactions may be received and handled by a marketing department associated with either the contact center 100 or analytics center 120. The analytics center 120 may be controlled by the same entity or a different entity than the contact center 100. Further, the analytics center 120 may be a part of, or independent of, the contact center 100.

Figure 2:
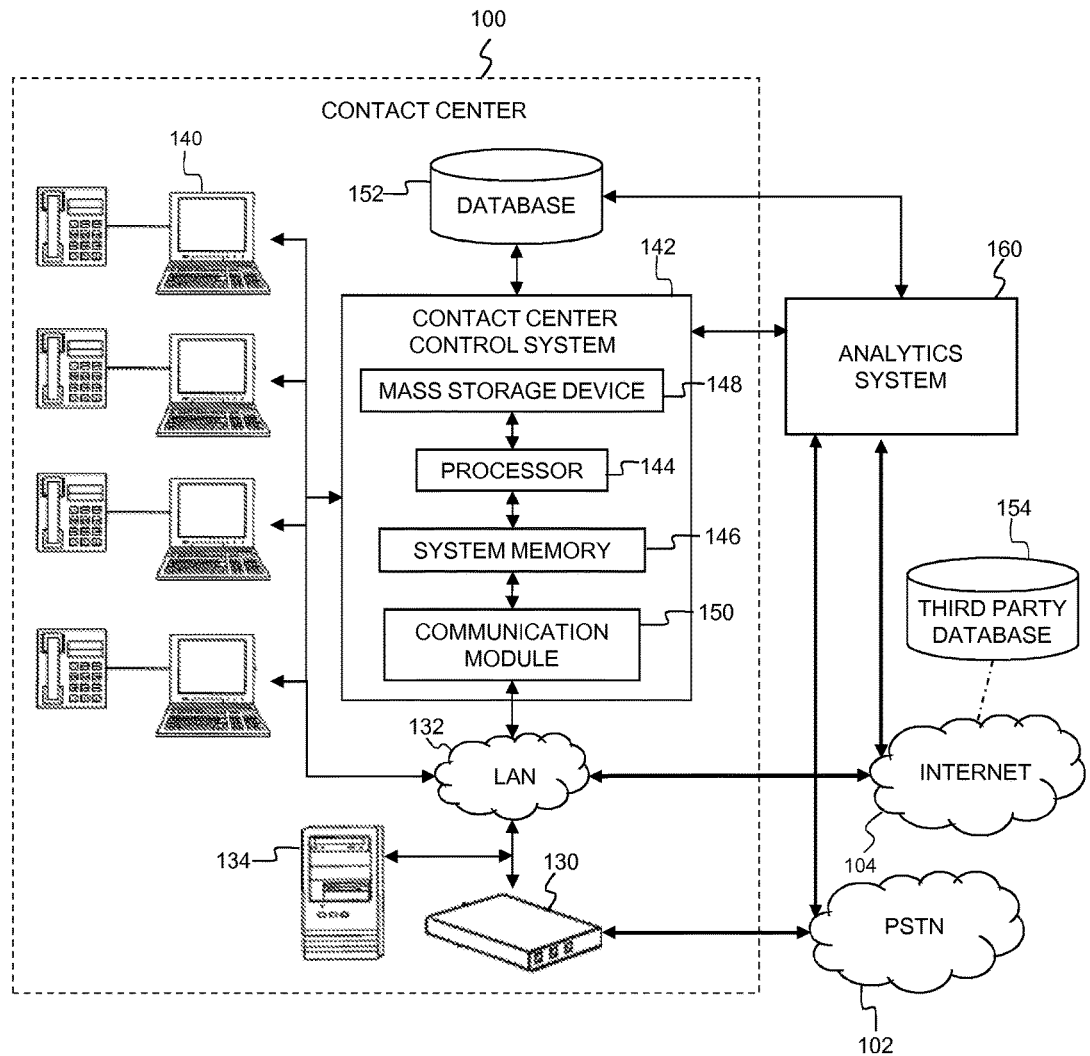
FIG. 2 is a more detailed block diagram of the contact center of FIG. 1 according to aspects of the present disclosure.

FIG. 2 is a more detailed block diagram of an embodiment of the contact center 100 according to aspects of the present disclosure. As shown in FIG. 2, the contact center 100 is communicatively coupled to the PSTN 102 via a distributed private branch exchange (PBX) switch 130. The PBX switch 130 provides an interface between the PSTN 102 and a local area network (LAN) 132 within the contact center 100. In general, the PBX switch 130 connects trunk and line station interfaces of the PSTN 102 to components communicatively coupled to the LAN 132. The PBX switch 130 may be implemented with hardware or virtually. A hardware-based PBX may be implemented in equipment located local to the user of the PBX system. In contrast, a virtual PBX may implemented in equipment located at a central telephone service provider that delivers PBX functionality as a service over the PSTN 102. Additionally, in one embodiment, the PBX switch 130 may be controlled by software stored on a telephony server 134 coupled to the PBX switch. In another embodiment, the PBX switch 130 may be integrated within telephony server 134. The telephony server 134 incorporates PBX control software to control the initiation and termination of connections between telephones within the contact center 100 and outside trunk connections to the PSTN 102. In addition, the software may monitor the status of all telephone stations coupled to the LAN 132 and may be adapted to respond to telephony events to provide traditional telephone service. In certain embodiments, this may include the control and generation of the conventional signaling tones such as dial tones, busy tones, ring back tones, as well as the connection and termination of media streams between telephones on the LAN 132. Further, the PBX control software may programmatically implement standard PBX functions such as the initiation and termination of telephone calls, either across the network or to outside trunk lines, the ability to put calls on hold, to transfer, park and pick up calls, to conference multiple callers, and to provide caller ID information. Telephony applications such as voice mail and auto attendant may be implemented by application software using the PBX as a network telephony services provider.

In one embodiment, the telephony server 134 includes a trunk interface that utilizes conventional telephony trunk transmission supervision and signaling protocols required to interface with the outside trunk circuits from the PSTN 102. The trunk lines carry various types of telephony signals such as transmission supervision and signaling, audio, fax, or modem data to provide plain old telephone service (POTS). In addition, the trunk lines may carry other communication formats such T1, ISDN or fiber service to provide telephony or multimedia data images, video, text or audio.

The telephony server 134 includes hardware and software components to interface with the LAN 132 of the contact center 100. In one embodiment, the LAN 132 may utilize IP telephony, which integrates audio and video stream control with legacy telephony functions and may be supported through the H.323 protocol. H.323 is an International Telecommunication Union (ITU) telecommunications protocol that defines a standard for providing voice and video services over data networks. H.323 permits users to make point-to-point audio and video phone calls over a local area network. IP telephony systems can be integrated with the public telephone system through an IP/PBX-PSTN gateway, thereby allowing a user to place telephone calls from an enabled computer. For example, a call from an IP telephony client within the contact center 100 to a conventional telephone outside of the contact center would be routed via the LAN 132 to the IP/PBX-PSTN gateway. The IP/PBX-PSTN gateway would then translate the H.323 protocol to conventional telephone protocol and route the call over the PSTN 102 to its destination. Conversely, an incoming call from a customer over the PSTN 102 may be routed to the IP/PBX-PSTN gateway, which translates the conventional telephone protocol to H.323 protocol so that it may be routed to a VoIP-enable phone or computer within the contact center 100.

The contact center 100 is further communicatively coupled to the Internet 104 via hardware and software components within the LAN 132. One of ordinary skill in the art would recognize that the LAN 132 and the connections between the contact center 100 and external networks such as the PSTN 102 and the Internet 104 as illustrated by FIG. 2 have been simplified for the sake of clarity and the contact center may include various additional and/or different software and hardware networking components such as routers, switches, gateways, network bridges, hubs, and legacy telephony equipment.

As shown in FIG. 2, the contact center 100 includes a plurality of agent workstations 140 that enable agents employed by the contact center to engage in customer interactions over one or more communication channels. In one embodiment, each agent workstation 140 may include at least a telephone and a computer workstation. In other embodiments, each agent workstation 140 may include a computer workstation that provides both computing and telephony functionality. Through the workstations 140, the agents may engage in telephone conversations with customer, initiate or respond to email inquiries, send or receive faxes, engage in instant message conversations, respond to website-based inquires, video chat with a customer, and otherwise participate in various customer interaction sessions across one or more communications channels. Further, in some embodiments, the agent workstations 140 may be remotely located from the contact center 100, for example, in another city, state, or country. Alternatively, in some embodiments, an agent may be a software-based application configured to interact in some manner with a customer. For instance, an agent may be an online chat program designed to interpret customer inquiries and respond with pre-programmed answers.

The contact center 100 further includes a contact center control system 142 that is generally configured to provide recording, prediction, behavioral analysis, storage, and other processing functionality to the contact center. In the illustrated embodiment, the contact center control system 142 is an information handling system such as a computer, server, workstation, mainframe computer, or other suitable computing device. In other embodiments, the control system 142 may be a plurality of communicatively coupled computing devices coordinated to provide the above functionality for the contact center 100. The control system 142 includes a processor 144 that is communicatively coupled to a system memory 146, a mass storage device 148, and a communication module 150. The processor 144 can be any custom made or commercially available processor, a central processing unit (CPU), an auxiliary processor among several processors associated with the control system 142, a semiconductor-based microprocessor (in the form of a microchip or chip set), a macroprocessor, a collection of communicatively coupled processors, or any device for executing software instructions. The system memory 146 provides the processor 144 with non-transitory, computer-readable storage to facilitate execution of computer instructions by the processor. Examples of system memory may include random access memory (RAM) devices such as dynamic RAM (DRAM), synchronous DRAM (SDRAM), solid state memory devices, and/or a variety of other memory devices known in the art. Computer programs, instructions, and data may be stored on the mass storage device 148. Examples of mass storage devices may include hard discs, optical disks, magneto-optical discs, solid-state storage devices, tape drives, CD-ROM drives, and/or a variety other mass storage devices known in the art. Further, the mass storage device may be implemented across one or more network-based storage systems, such as a storage area network (SAN). The communication module 150 is operable to receive and transmit contact center-related data between local and remote networked systems and communicate information such as customer interaction recordings between the other components coupled to the LAN 132. Examples of communication modules may include (without limitation) Ethernet cards, 802.11 WiFi devices, cellular data radios, satellite dish, and/or other suitable devices known in the art. The contact center control system 142 may further include any number of additional components, which are omitted for simplicity, such as input and/or output (I/O) devices (or peripherals), buses, dedicated graphics controllers, storage controllers, buffers (caches), and drivers. Further, functionality described in association with the control system 142 may be implemented in software (e.g., computer instructions), hardware (e.g., discrete logic circuits, application specific integrated circuit (ASIC) gates, programmable gate arrays, field programmable gate arrays (FPGAs), etc.), or a combination of hardware and software.

According to one aspect of the present disclosure, the contact center control system 142 is configured to record and collect multi-channel customer interaction data and other structured and unstructured data for use in predictive models, agent evaluation and training programs, and other tools utilized to increase efficiency and efficacy of the contact center. As an aspect of this, the control system 142 is operable to record unstructured interactions between customers and agents occurring over different communications channels such as telephone conversations, email exchanges, website postings, social media communications, smartphone application (i.e., app) communications, fax messages, instant message conversations. For example, the control system 142 may include a hardware or software-based recording server to capture the audio of a standard or VoIP telephone connection established between an agent workstation 140 and an outside customer telephone system. Further, the audio from an unstructured telephone call, recorded message, or video conference session may be transcribed manually or automatically, and stored in association with the original audio or video.

In addition to unstructured interaction data such as interaction transcriptions, the control system 142 is configured to capture structured data related to customers, agents, and their interactions. For example, in one embodiment, a "cradle-to-grave" recording may be used to record all information related to a particular telephone call from the time the call enters the contact center to the later of: the caller hanging up or the agent completing the transaction. All of the interactions during the call may be recorded, including interaction with an interactive voice response (IVR) system, time spent on hold, data keyed through the caller's key pad, conversations with the agent, and screens displayed by the agent at his/her station during the transaction. Additionally, structured data associated with interactions with specific customers may be collected and associated with each customer such as the number and length of calls placed to the contact center, call origination information, reasons for interactions, outcome of interactions, average hold time, agent actions during interactions with customer, manager escalations during calls, types of social media interactions, number of distress events during interactions, survey results, and other interaction information. In addition to collecting interaction data associated with a customer, the control system 142 is also operable to collect biographical profile information specific to a customer, such as customer phone number, account/policy numbers, address, employment status, income, gender, customer "value" data (i.e., customer tenure, money spent as customer, etc.), personality type (e.g., as determined by past interactions), and other relevant customer identification and biological information. The control system 142 may also collect agent-specific unstructured and structured data such as agent personality type, gender, language skills, performance data (e.g., customer retention rate, etc.), tenure and salary data, training level, average hold time during interactions, manager escalations, agent workstation utilization, and any other agent data relevant to contact center performance. Additionally, one of ordinary skill in the art would recognize that the types of data collected by the contact center control system that are identified above are simply examples and additional and/or different interaction data, customer data, agent data, and telephony data may be collected and processed by the control system 142.

The control system 142 may store recorded and collected interaction data in a database 152. The database may be any type of reliable storage solution, such as a RAID-based storage server, an array of hard disks, a storage area network of interconnected storage devices, an array of tape drives, or one or more other scalable storage solution(s) located either within the contact center or remotely located (i.e., in the cloud), or both. Further, in other embodiments, the contact center control system 142 may have access to not only to data collected within the contact center 100 but also data made available by external sources such as a third party database 154. In certain embodiments, the control system 142 may query the third party database for customer data, such as credit reports, past transaction data, and other structured and unstructured data.

The multi-channel interaction data collected in the context of the control center 100 may be subject to a linguistic-based psychological behavioral model to assess the personality of customers and agents associated with the interactions. For example, such a behavioral model may be applied to the transcription of a telephone call, instant message conversation, or email thread, or any other such information from one or more channels between a customer and agent to gain insight into why a specific outcome resulted from the interaction. In one embodiment, interaction data is mined for behavioral signifiers associated with a linguistic-based psychological behavioral model. In particular, the contact center control system 142 searches for and identifies text-based keywords (i.e., behavioral signifiers) relevant to a predetermined psychological behavioral model.

According to one embodiment of the present disclosure, the psychological behavioral model used to analyze the interaction transcript data is the Process Communication Model® ("PCM") developed by Dr. Taibi Kahler. PCM is a psychological behavioral analytic tool which presupposes that all people fall primarily into one of six basic personality types: Reactor, Workaholic, Persister, Dreamer, Rebel and Promoter. Although each person is one of these six types, all people have parts of all six types within them arranged like a six-tier configuration. Each of the six types learns differently, is motivated differently, communicates differently, and has a different sequence of negative behaviors they engage in when they are in distress. Importantly, according to PCM, each personality type of PCM responds positively or negatively to communications that include tones or messages commonly associated with another of the PCM personality types. Thus, an understanding of a communicant's PCM personality type may offer guidance as to an appropriate responsive tone, message, or wording, or combination thereof.

When a behavioral signifier is identified within unstructured interaction data, the identified behavioral signifier may be executed against a system database which maintains all of the data related to the psychological behavioral model. Based on the behavioral signifiers identified in the analyzed interaction data, a predetermined algorithm is preferably used to decipher a linguistic pattern that corresponds to one or more of the PCM personality types. More specifically, the control system 142 may mine for linguistic indicators (words and phrases) that reveal the underlying personality characteristics of the speaker/participant during periods of distress. Non-linguistic indicators may also be identified to augment or confirm the selection of a style for each segment of speech. Although one embodiment of the present invention employs PCM as the linguistic-based psychological behavioral model, it is contemplated that any known linguistic-based psychological behavioral model may be employed without departing from the present invention. For example, application of behavioral models may be applied as described in U.S. Patent Publication No. 2011/0249811, published Oct. 13, 2011, the entire contents of which is incorporated herein by express reference thereto.

In addition to the behavioral assessment of interaction data, the control system 142 may also or alternatively apply distress analysis techniques to interaction data to detect distress events. For example, when applied to a telephone or video-based interaction session, linguistic-based distress analysis may be conducted on both a textual translation of voice data and an audio file containing voice data. Accordingly, linguistic-based analytic tools as well as non-linguistic analytic tools may be applied to the audio file. In particular, the control system 142 may apply spectral analysis to the audio file voice data while applying a human speech/linguistic analytical tool to the text file. Linguistic-based analysis and algorithms for identifying distress can be applied to the textual translation of the communication. Resultant distress data may be stored in the database 152 or elsewhere for subsequent analysis of the communication. Distress event data and other linguistic-based analytic data may be considered behavioral assessment data in some instances. Further, in other embodiments, the control system 142 may be operable to apply voice printing techniques to the unstructured audio from various customer interactions. For example, a recorded sample may be utilized to identify, or facilitate identification of, a customer in the event the customer did not supply any identifying information.

Figure 3:
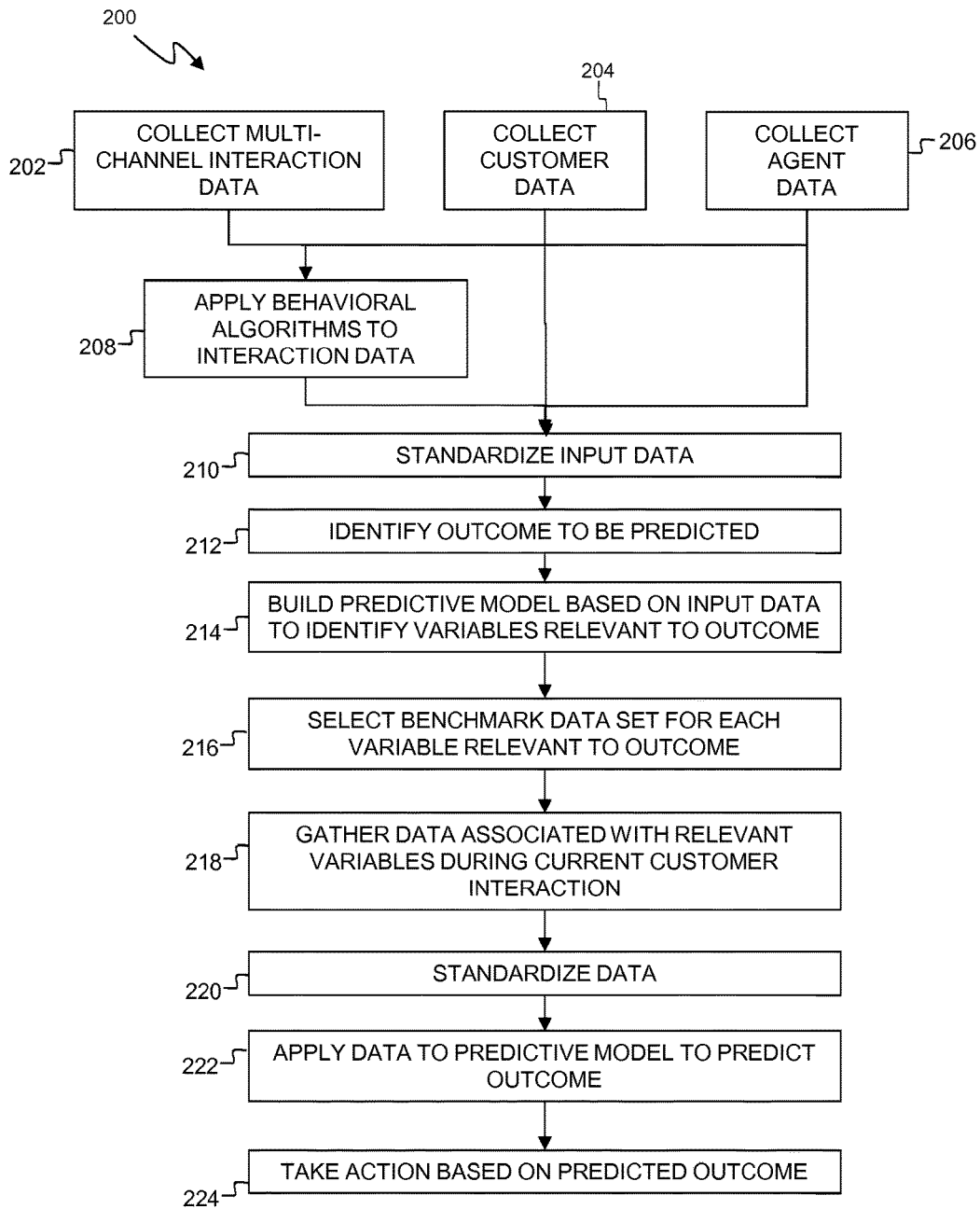
FIG. 3 is a high-level flowchart illustrating a method for customer interaction outcome prediction according to aspects of the present disclosure.
Figure 4:
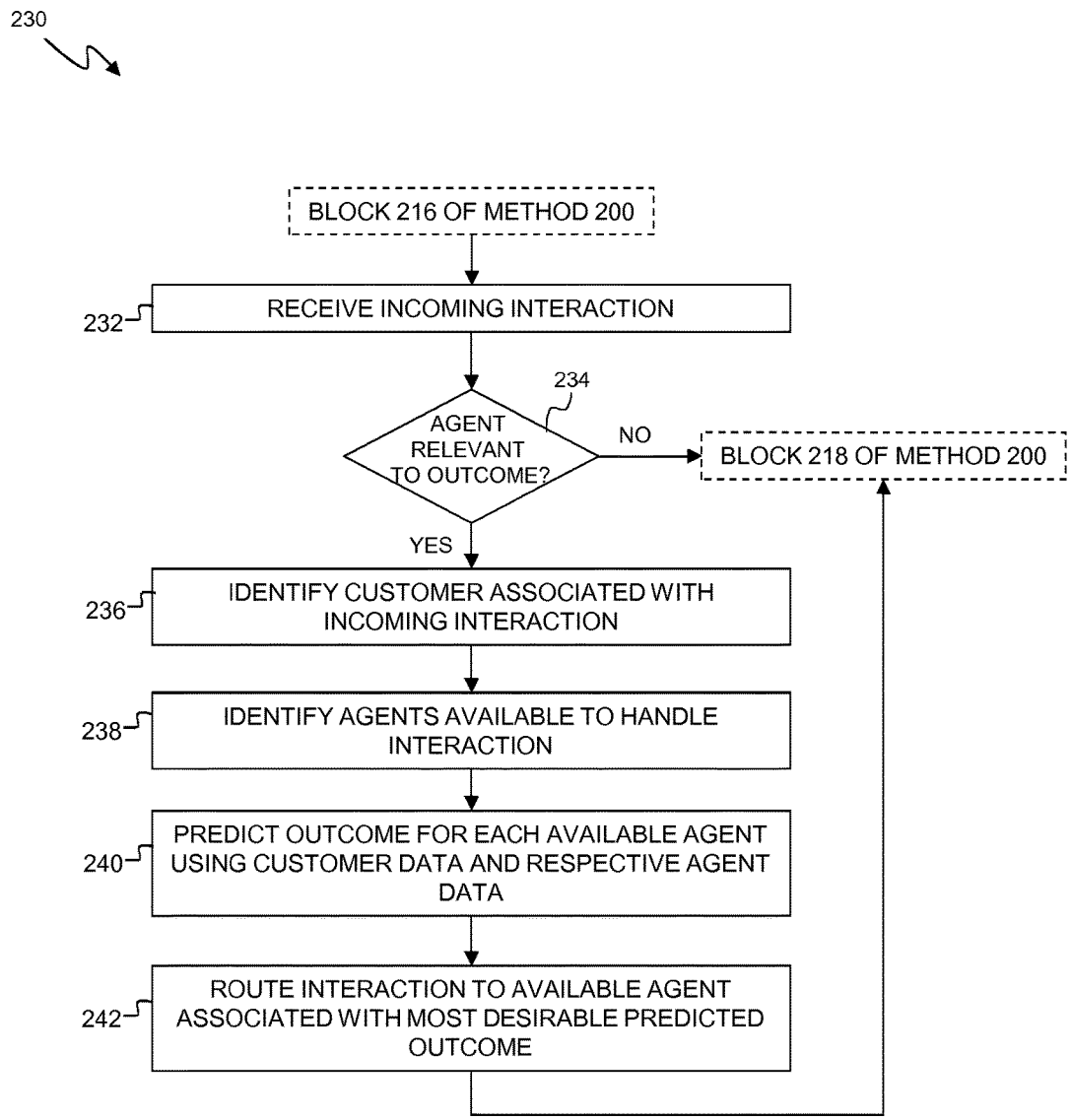
FIG. 4 is a high-level flowchart illustrating a method for agent selection based on customer interaction outcome prediction according to another embodiment of the present disclosure.
Figure 5:
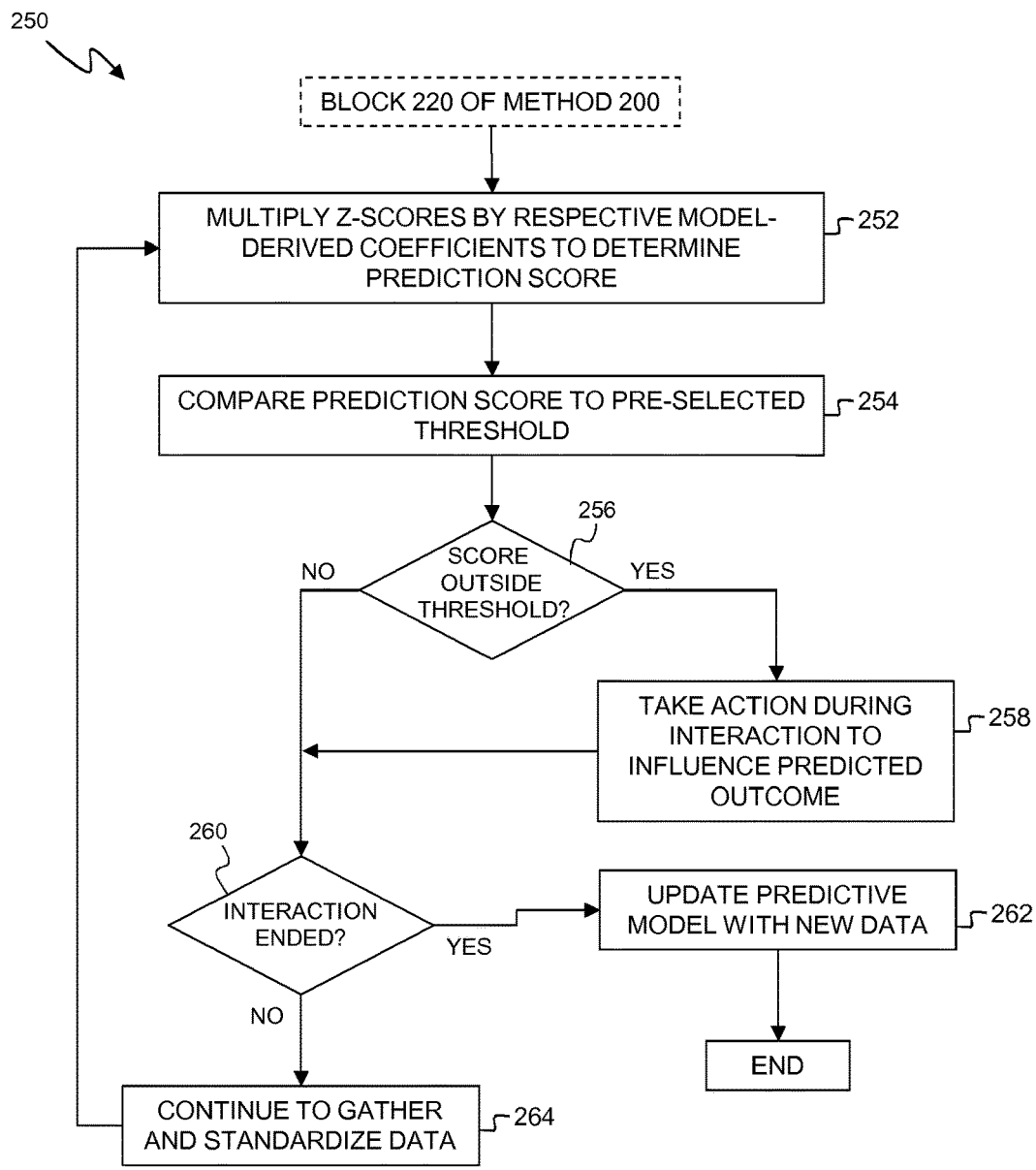
FIG. 5 is a high-level flowchart illustrating a method for continuous customer interaction outcome prediction according to another embodiment of the present disclosure.

As described herein in association with FIGS. 3-5, customer data, agent data, and/or behavioral assessment of interaction data (i.e., personality type, linguistic analysis data, distress analysis data, etc.) may be employed to create more accurate predictive models for use in the contact center 100. Such models may in various embodiments be generated with any number of these data types, including any combination of two, or all three, data types together. In one embodiment, the contact center control system 142 includes predictive analytics software operable to create binary logistic regression models based on collected structured and unstructured contact center data.

Additionally, in some embodiments, an analytics system 160 may also perform some or all of the functionality ascribed to the contact center control system 142 above. For instance, the analytics system 160 may record telephone and internet-based interactions, perform behavioral analyses, generate interaction outcome predictions using predictive analytics software, and perform other contact center-related computing tasks. The analytics system 160 may be integrated into the contact center control system 142 as a hardware or software module and share its computing resources 144, 146, 148, and 150, or it may be a separate computing system housed, for example, in the analytics center 120 shown in FIG. 1. In the latter case, the analytics system 160 includes its own processor and non-transitory computer-readable storage medium (e.g., system memory, hard drive, etc.) on which to store predictive analytics software and other software instructions.

Referring now to FIG. 3, illustrated is a high-level flowchart illustrating a method 200 for customer interaction outcome prediction according to aspects of the present disclosure. The customer interaction is real-time in certain embodiments, but may be time-independent in other embodiments. The method 200 may be utilized to predict the likelihood of an identified outcome occurring in association with a current customer interaction based on a predictive model build using standardized input data including multi-channel interaction input data. In the illustrated embodiment, at least a portion of the method 200 is carried out by the contact center control system 142 and/or the analytics system 160 of FIG. 2. Further, in one embodiment, portions of the method 200 may be implemented as computer-readable instructions stored on the mass storage device 148 or system memory 146 and executed by the processor 144 of the control system 142 and/or the analytics system 160 of FIG. 2.

The method 200 begins at blocks 202, 204, and 206 where data to be input into a predictive model is collected, identified, and/or gathered. Specifically, in block 202, multi-channel interaction data is collected by the control system 142 and/or the analytics system 160 from one or preferably a plurality of channels of interaction between customer and agent. As mentioned above, interaction data can include unstructured and structured data from a plurality of different communication channels utilized by an agent to interact with a customer. For example, interaction data may include a transcription of a previous telephone call or video chat between a customer and an agent, the text of an email exchange between the customer and agent, a written essay or other text unilaterally submitted by a customer, an applicant's enrollment application, or a pre-recorded video clip submitted by a customer. Further, structured telephony data such as call length, call origination, hold time, interaction outcome data, and similar data associated with customer interactions may also be collected in block 202. The customer profile data collected in block 204 includes biographical and identification information such as that described above in association with FIG. 2, and the agent data collected in block 206 includes training level, personality type, and other similar data such as that described above in association with FIG. 2. In some embodiments, the input data collected and/or identified in blocks 202, 204, and 206 may be derived from customer interactions occurring within the contact center 100 and stored in the database 152, however, in other embodiments, the data may be imported from external sources such as third party databases operated by data collection companies.

As part of the collection of input data, the contact center control system 142 and/or the analytics system 160 may apply behavioral algorithms to the multi-channel interaction input data in block 208. For example, a psychological behavioral model, such as the PCM described above, may be applied to the collected interaction data to derive personality data and other behavioral assessment information about customers and agents. Further, in certain embodiments, the customer data of block 204 and the agent data of block 206 may also be used as inputs into behavioral algorithms in block 208, for instance, to increase the accuracy or relevance of the behavioral profiles.

After input data, including multi-channel interaction data, customer data, and agent data, has been collected and/or identified, the method 200 proceeds to block 210, where the input data is preferably standardized (i.e., normalized). Because the input data represents a plurality of different aspects associated with contact center operations, the input data is heterogeneous in both format and meaning. A predictive model based on heterogeneous data may produce inaccurate or unreliable prediction results. Standardization of the input data advantageously can improve predictive model performance. In that regard, the control system 142 and/or the analytics system 160 is configured to assign a dimensionless numerical value to each data value associated with the multi-channel interaction data, customer data, and agent data that indicates the data value's deviation from an average of data values associated with the same variable. In one embodiment, a standard score (or z-score) may be derived for each heterogeneous data value by first determining the mean and standard deviation of data values associated with the same variable and then determining how many standard deviations the particular data value is above or below the mean. As an example, the multi-channel interaction data may include information about the number of distress events occurring during telephone calls between customers and agents. To standardize the distress event information, the average number of distress events per call and the associated standard deviation may first be calculated. In certain embodiments, the set of data values from which the average is calculated (i.e., the benchmark data set) may be the entire pool of calls for which distress data is available; however, in alternative embodiments, the benchmark data set may be some subset of the total collected data, such distress event data for telephone calls occurring within the past year or for another matching parameter such as the type of product being discussed by the customer and contact center agent. After the mean and standard deviation for the benchmark data set is determined, each individual data value is subtracted from the mean and the difference is divided by the standard deviation to arrive at a z-score. As another example, a customer's personality type, as determined by the above-described behavioral algorithm, may be assigned a z-score. In such an example, those personality types that occur less frequently would be assigned higher z-scores. Of course, altering the benchmark data sets upon which the personality z-scores of customers are based may alter the z-scores. For instance, a benchmark data set may include all customers for which interaction data is available, may include only those customers that participated in interaction sessions in the past month, may include only male customers, or may include any other subset of input data, or any combination thereof.

As a result of the standardization in block 210, the input data—including unstructured and structured multi-channel interaction data, customer data, and agent data—is preferably converted into a homogenous input data set and may be utilized to build a predictive model in a consistent manner. One of ordinary skill in the art would recognize that additional and/or different methods of standardizing and normalizing may be applied to the input data collected in blocks 202, 204, and 206.

The method 200 next proceeds to block 212 where an outcome associated with a customer interaction is identified as a target of a predictive model. In more detail, for a contact center it may be desirable to predict the likelihood of some specific outcome occurring in association with a current customer interaction, be it a telephone-based interaction, web-based interaction, or other type of electronic-assisted interaction. For example, it may be useful for a company to predict during a customer interaction whether the customer will be satisfied as a result of the most recent interaction, taking into account the activities, outcomes, and experiences from prior interactions. Further examples of outcomes associated with a customer include whether a customer will terminate his or her account, whether the customer will purchase a product, whether a customer will pay an outstanding bill, whether a customer is a fraudster, and whether a customer will initiate additional subsequent interaction sessions regarding the same issue, or a combination thereof. Additionally, the method 200 may be used to predict more specific outcomes associated with particular fields in which contact centers may be used. For example, the outcome identified in block 212 may be the likelihood a customer will apply for enrollment in a particular education institution or need financial aid in general or at that particular institution; the likelihood a customer will recommend one of a specific service, company, or product to another customer; or the likelihood a customer will cure collections debt. Other outcomes identified in block 212 may be whether a job applicant is suitable for a specific job opening, whether an applicant will accept a job offer, whether an applicant meets one or more pre-defined hiring criteria, and whether a person applying for enrollment at an educational institution meets one or more pre-defined acceptance criteria. This is a non-exhaustive list and additional and/or different outcomes related to a customer or customer interaction may be identified.

Once an outcome to be predicted is identified, the method proceeds to block 214 where a predictive model operable to predict the likelihood of the identified outcome occurring is built using the input data as standardized in block 210. Specifically, in one embodiment, the standardized input data is fed into predictive analytics software that creates a binary logistic regression model based on the input data. The regression model identifies the variables within the input data that correlate to the identified outcome in the context of a customer interaction. Further, a regression coefficient may be assigned to each identified variable to establish the contribution of the variable to the predicted outcome. As an example, the model may indicate that whether a customer will cancel his or her service is correlated to the customer's personality, the number of distress events during a call, the agent's experience, and the customer's tenure, and assign a coefficient to each of the four variables. As will be discussed in detail below, data points associated with each of these four factors may be collected during a current customer interaction, aggregated at the customer level as needed, and multiplied by their respective coefficients to generate a prediction score indicative of the likelihood that a customer will cancel his or her service. One of ordinary skill in the art would recognize that the above example is simply an illustration presented for the purposes of clarity, and the identified outcome may differ, as may the number of variables identified as relevant to that outcome, which may be smaller or much greater.

In certain embodiments, the contact center control system 142 and/or the analytics system 160 includes predictive analytics software executing thereon that builds the predictive model of block 214. Specifically, in one embodiment, the predictive analytics software is IBM® SPSS® Regression available from IBM®, however, in other embodiments, the predictive analytics software may be another commercially available predictive analytics product or may be a proprietary program customized for contact center prediction scenarios, or a combination thereof.

After a predictive model has identified variables relevant to the identified outcome in block 214, the method 200 proceeds to block 216 where a benchmark data set is selected for each identified variable. Specifically, to accurately apply the predictive model to incoming customer interactions (i.e., telephone calls, etc.), data values related to the relevant variables collected during the incoming customer interactions are standardized before being fed into the model. As discussed above, benchmark data sets define the particular data against which a data value is compared for the generation of its z-score. In other words, selecting a different benchmark data set may generate a different z-score, which, in turn, may result in a different outcome prediction. Thus, selection of benchmark data sets may be utilized to customize prediction results. For example, it may be desired to determine the likelihood of a customer purchasing a product in view of customer interactions recorded in the past six months, rather than all customer interactions ever recorded. To achieve such a prediction result, the benchmark data sets selected in block 216 would include data associated with customer interactions occurring in the past six months. For example, if the number of distress events per call is deemed relevant to predict an outcome, the number of distress events during a current call may be compared against a benchmark data set that only includes calls recorded in the past six months. Additionally, benchmark data sets may be based on other criteria besides time periods. In one example embodiment, a benchmark data set associated with agent salary may be selected that includes agent salary data for different subsets of agents, for example, agents located within a specific contact center or region of the country. Accordingly, one of ordinary skill in the art would recognize that benchmark data sets may be defined based on a plurality of factors such as time periods, geographical distinctions, biographical variables, and any number of additional factors that limit the input data upon which the above standardization process is based. Additionally, the benchmark data sets selected in block 216 may be the same as or different than the benchmark data sets utilized to standardize the input data in block 210.

The method 200 next proceeds to block 218 where a current customer interaction is initiated between an agent associated with the contact center 100 and a customer. As mentioned above, the predictive model is utilized to determine the likelihood of the identified outcome occurring in association with the current interaction. This interaction may be a telephone call, video chat, instant message conversation, email exchange, or other communication session as described herein. The interaction can be real-time, near real-time (i.e., within 5 minutes, preferably within 2 minutes, and more preferably within 1 minute of capture), previously captured, or a combination thereof. In certain preferred embodiments, it is real-time. During the course of the interaction, the contact center control system 142 and/or the analytics system 160 collects new data, preferably real-time or near real-time, associated with the variables identified as relevant to predicting the identified outcome. Referring back to a previous example, if the customer's personality, the number of distress events during a call, the agent's experience, and the customer's tenure are deemed relevant to the identified outcome of a customer canceling his or her service, real-time or near real-time data values associated with each of the variables are collected during the course of the current interaction. In this regard, the control system 142 and/or the analytics system 160 may generate a transcript of the interaction and apply a linguistic-based behavior model to determine the personality of the customer and apply a distress identification technique to determine the number of distress events that have occurred thus far during the interaction. Further, data associated with the agent's experience and customer's tenure may be retrieved from a database, such as database 152, at the onset of the interaction. Depending on the variables identified as relevant to predicting the identified outcome, any different and/or additional real-time data may be collected during the course of a current customer interaction. In some embodiments, the data is collected in near real-time, or a combination thereof with real-time data. To simply the discussion herein, some of the embodiments herein are discussed only in connection with real-time, but should be understood to encompass any of the above-noted possibilities for capturing an interaction.

After relevant data has been collected in block 218, the method continues to block 220 where the collected data is standardized. According to aspects of the present disclosure, the collected data is standardized using the benchmark data sets selected in block 216. In other words, each data value gathered during the interaction is assigned a dimensionless standard score (or z-score) that indicates the data value's deviation from the mean of the data values in the respective benchmark data set. The data, as noted herein, is preferably near real-time or real-time, and more preferably includes real-time data. As described above, selecting different benchmark data sets in block 216 may affect a data value's z-score calculated in block 220.

Once the data values corresponding with the relevant variables have been standardized in block 220, the method proceeds to block 222 where the standardized real-time data values are applied to the predictive model to calculate a likelihood that the identified outcome will occur in association with the current customer interaction. In more detail, each of the z-scores associated with the real-time data values are multiplied by their respective regression coefficient as determined by the predictive model. In one embodiment, the result is a prediction score between zero and one that indicates the likelihood that the identified outcome will occur in association with the current customer interaction, with a score of one being arranged to represent a 100% probability that the outcome will occur. As will be described in association with FIG. 5, the prediction score may be compared to a threshold so as to convert the prediction score into a binary (i.e., yes/no) prediction. In the illustrated embodiment, the predictive result is obtained during the course of the interaction, but, in alternative embodiments, the real-time data may be gathered during the current customer interaction but the predictive result may be calculated after the termination of the interaction. The threshold itself can, for example, be manually selected, based on historical data as to the likelihood of the predicted outcome occurring, or based on predictive modeling, or a combination of the latter two options.

The method 200 ends at block 224, where some action may be optionally taken based on the outcome prediction made in block 222. In one embodiment, some action may be taken during the current customer interaction to influence the predicted outcome, but in alternative embodiments, action may be taken after the termination of the current interaction, or no action may be taken at all depending on the prediction result. Further, in certain embodiments, the agent interacting with the customer may receive the predictive score at the agent workstation 140 and optionally take some action if warranted by the score, such as an action to mitigate customer attrition. In other embodiments, after calculating the prediction score, the contact center control system 142 and/or the analytics system 160 may automatically take some action based on the calculated score, such as sending an email to the customer or sending a signal to the agent prompting him or her to say or do something specific. As an example, if the predictive results obtained in block 222 indicate that there is a high likelihood that a customer will terminate his or her service during or after the current interaction, some remedial action may be taken during or after the current interaction to prevent the customer from terminating. Alternatively, if the probability of termination is sufficiently high, the action taken may be for the call center agent to conclude the interaction as quickly as possible. As another example, if the predictive results indicate that there is a low likelihood that the customer will be satisfied as a result of the interaction, the agent may make a special offer to the customer during the pendency of the interaction, or the contact center control system may automatically send an email with the special offer to the customer based on the calculated score. Still further, the action taken in block 224 may unrelated to influencing the likelihood of the identified outcome occurring. For example, the predicted outcome may be utilized generate an agent performance score or generate training materials for agent training purposes, as will be described in association with FIG. 6.

It is understood that the method 200 for real-time customer interaction outcome prediction is simply an example embodiment, and, in alternative embodiments, additional and/or different steps may be included in the method and the actions performed in association with the blocks of the method may be performed in an alternative order. For example, in one embodiment, if the predictive model built in block 214 indicates that a factor associated with the particular agent conducting the interaction impacts the likelihood of the identified outcome occurring, the method 200 may include additional blocks in which it is determined which agent or group of agents would be most suited to handle an incoming interaction request from a customer. In that regard, FIG. 4 is a high-level flowchart illustrating a method 230 for agent selection based on customer interaction outcome prediction according to another embodiment of the present disclosure. Specifically, the method 230 is similar to method 200 of FIG. 3 but includes additional blocks associated with selecting an appropriate agent to handle an incoming interaction. The method 230 continues from block 216 of method 200 to block 232 where the contact center 100 receives an incoming interaction. In decision block 234, it is determined whether the particular agent handling an interaction has any statistically significant influence on the likelihood of the identified outcome occurring. That is, it is determined whether any of the variables identified in block 214 are associated with agent data collected in block 206. If the identified outcome is not influenced by the particular agent handling an interaction, the method 230 continues on to block 218 of method 200 after the interaction is routed to any available agent. If, instead, a factor associated with an agent is relevant to the identified outcome, the method 230 proceeds to block 236 where the customer initiating the incoming interaction is identified. A customer may be identified in various manners, such as through caller ID, customer voice printing, and customer interactions with an IVR system, or a combination of such factors. Next, in block 238, the contact center 100 identifies which agents are available to handle the incoming interaction. The method 230 then proceeds to block 240 where the likelihood of the identified outcome occurring is calculated using the agent data associated with each available agent. That is, in block 240, a plurality of prediction scores may be generated by applying data respectively associated with each available agent and also previously-collected data associated with the identified customer to the predictive model. The plurality of prediction scores may indicate that the identified outcome may be more likely to occur with some agents and less likely to occur with other agents. Then, in block 242, the contact center 100 routes the incoming interaction to the available agent associated with the most desirable predicted outcome out of the plurality of predicted outcomes. After an agent is selected, the method 230 continues on to block 218 of method 200. As an example of method 230, if the identified outcome is whether a customer will be satisfied with a telephone call interaction, the predictive model may determine that number of years of experience of an agent has an impact on whether the customer will be satisfied. When a call comes in and the customer is identified, a plurality of prediction scores indicating the likelihood of customer satisfaction may be calculated, for example, using the customer's information and each available agent's years of experience. The call is thus routed to the agent associated with the prediction score indicating the highest likelihood of satisfaction. One of ordinary skill in the art would recognize that utilizing the predictive model to route interactions to a particular agent may be employed for various additional and/or different identified outcomes such as whether a customer will terminate a service, whether a customer will make a purchase, whether a customer will make a payment, and any other outcome that depends, at least in part, on the particular agent conducting the interaction.

Referring now to FIG. 5, illustrated is a high-level flowchart illustrating a method 250 for continuous real-time customer interaction outcome prediction according to another embodiment of the present disclosure. Specifically, the method 250 is similar to method 200 of FIG. 3 but includes additional blocks associated with continuously updating a prediction score during the course of a current customer interaction.

The method 250 continues from block 220 of method 200 to block 252 where a prediction score is calculated by multiplying the z-scores associated with the real-time data values collected in block 218 by the regression coefficients derived by the predictive model. As mentioned above, in one embodiment, the prediction score may be a number from zero to one, with a score of one indicating the highest likelihood of the identified outcome occurring. In other embodiments, the prediction score may be a number in a different range or may be another type of indicator. The method 250 continues to block 254 where the prediction score is compared to a pre-selected threshold. In more detail, a pre-selected threshold in this context is a value in the range of possible prediction scores (e.g., between zero and one) against which the prediction score is compared so as to convert it into a binary (i.e., yes/no) prediction. For example, if the identified outcome to be predicted is the satisfaction of a customer at the end of the current interaction, a contact center may set a customer satisfaction threshold at 80%. In such an example, if the prediction score calculated in block 252 is 0.8 or higher on a scale from zero to one, it is predicted that the customer will be satisfied, but if the prediction score is below 0.8, it is predicted that the customer will not be satisfied. The conversion of the prediction score to a binary prediction is useful in mitigation or remediation procedures, as discussed below. In alternative embodiments, the pre-selected threshold may include a plurality of threshold levels within the prediction score range. For instance, a threshold level may be set at 0.4 and another threshold level set at 0.8. As an example, a customer's predicted satisfaction may be slotted into multiple satisfaction ranges, such as unsatisfied, mostly satisfied, and completely satisfied, using the plurality of threshold levels. Different remedial actions may be taken based on the predicted satisfaction level.

After the prediction score is compared to the pre-selected threshold in block 254, the method 250 moves to decision block 256 where it is determined whether the prediction score is outside (i.e., above or below, depending on the context) the threshold. If the prediction score is outside of the threshold, the method 250 proceeds to block 258 where action is taken during the interaction to influence the predicted outcome. In one example embodiment, if a prediction score associated with whether a customer will be satisfied at the end of the current interaction is 0.6 and the satisfaction threshold is 0.8, the agent, contact center control system 142/analytics system 160, or both may take some remedial action during the interaction to influence the satisfaction of the customer. In one embodiment, the remedial action taken during block 258 may be the control system 142 and/or the analytics system 160 displaying on-screen remedial instructions at an agent workstation. For example, if it is predicted that the customer is not going to purchase a product, instructions to offer the customer a complementary accessory may be displayed on the agent's workstation, or if it is predicted that the customer is not going to pay an overdue bill, instructions on how best to collect the payment may be presented on the agent's workstation. In another embodiment, the raw prediction score and/or binary prediction result may be displayed on the agent's workstation so that the agent is altered to the unfavorable prediction and can take mitigating action. Further, in embodiments in which the interaction between the agent and customer is an instant message conversation, the control system 142 and/or the analytics system 160 may automatically send an instant message to the customer to influence the predicted outcome. One of ordinary skill in the art would recognize that the above examples of actions taken when a prediction score is outside of a pre-selected threshold are simply illustrations and additional and/or different actions may be taken by the control system 142, the analytics system 160, the agent, or another entity or system associated with the contact center 100.

After action has been taken during the current interaction in block 258 or the prediction score was not outside of the threshold, the method proceeds to decision block 260, where it is determined whether the interaction has ended. If the current interaction has ended, the method proceeds to block 262 where the real-time data collected during the interaction is used to update the predictive model. That is, the real-time data is added to the previously-collected input data and the updated data set is input into the predictive analytics software so that the software may produce an updated predictive model for use in the next customer interaction. If, instead, the current customer interaction has not ended, the method 250 continues to block 264 where the control system 142 and/or the analytics system 160 continues to collect and standardize real-time data associated with the variables deemed relevant to the identified outcome. For instance, the control system may continue to transcribe the audio interaction and analyze the unstructured data for behavioral signifiers and/or distress events, or may continue to monitor the length of the interaction and count the number of times the customer is placed on hold. Further, structured real-time data, in addition to unstructured real-time data, may need to be updated after a remedial action is taken. For example, if the remedial action performed in block 258 is transferring the call to a different agent, the agent data associated with the variables identified as outcome relevant would need to be updated.

Once updated real-time data corresponding to the relevant variables has been collected and standardized, the method 250 returns to block 252 where an updated prediction score is calculated with the predictive model. Specifically, a second prediction score calculated during a current customer interaction may be different than the first prediction score because of the remedial action taken during block 258. For example, a second prediction score of whether a customer will be satisfied at the conclusion of the interaction may indicate a greater likelihood of satisfaction than the first prediction score calculated before a first remedial action. After a second prediction score is calculated, it is compared to the pre-selected threshold in block 254. If the second prediction score is still outside of the pre-selected threshold, the method moves to block 258 and a second remedial action to further influence the predicted outcome is taken by the control system 142 and/or the analytics system 160, the agent, or both. In this manner, a prediction as to an identified outcome associated with a current customer interaction may be determined a plurality of times during the interaction and a corresponding plurality of remedial actions may be taken until a prediction score is within a pre-selected threshold. For instance, an agent may offer subsequently increasing discounts on a service until it is predicted a customer will not terminate the service after the interaction.

It is understood that the method 250 for continuous real-time customer interaction outcome prediction is simply an example embodiment, and, in alternative embodiments, additional and/or different steps may be included in the method and the actions performed in association with the blocks of the method may be performed in an alternative order.

Figure 6:
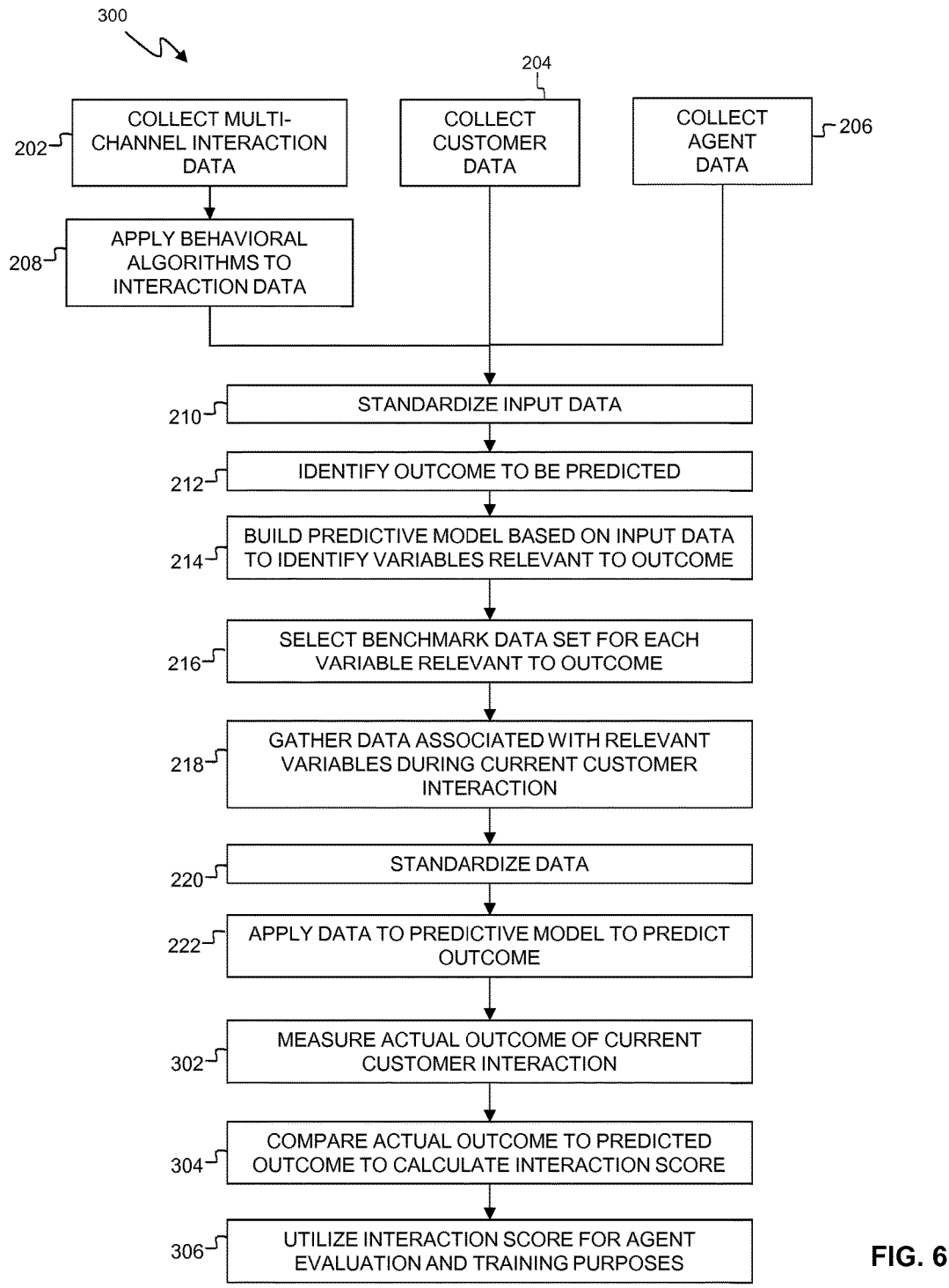
FIG. 6 is a method of training a contact center agent using customer interaction outcome prediction according to various aspects of the present disclosure.

Referring now to FIG. 6, illustrated is a method 300 of evaluating and training a contact center agent using customer interaction outcome prediction according to various aspects of the present disclosure. Specifically, the method 300 is similar to the method 200 of FIG. 3. In that regard, similar blocks of the method 300 are labeled with similar reference numerals; however, all aspects of similarly labeled blocks may not be the same.

The method 300 begins at blocks 202, 204, and 206 where data to be input into a predictive model is collected, identified, and/or gathered. Specifically, in block 202, multi-channel interaction data is collected by the control system and in blocks 204 and 206 customer data and agent data are respectively collected by the control system. After behavioral algorithms have been applied to the multi-channel interaction input data block 208 and all of the data values in the input data have been standardized in block 210, the method 300 continues through blocks 212-220 in a similar fashion to method 200. In block 222, real-time data collected during a current customer interaction is applied to the predictive model built in block 214 to predict the likelihood of the identified outcome occurring either during or after the current customer interaction. As described in association with FIGS. 3 and 4, in certain embodiments, a prediction score may be generated that is indicative of the likelihood of the identified outcome occurring.

After a prediction result is calculated and the current customer interaction has terminated, the method 300 moves to block 302 where the actual outcome of the customer interaction is measured or recorded. For example, whether a customer actually made a purchase, actually terminated his or her service, or was actually satisfied with the resolution of the interaction is recorded.

In block 304 of method 300, the actual outcome of the customer interaction is compared to the predicted outcome to generate an interaction score associated with the agent conducting the interaction. For example, if in block 222 it was predicted that there was a low likelihood that a customer would make a purchase as a result of the customer interaction, but the customer actually made a purchase, the agent would be assigned a positive interaction score. Likewise, if it was predicted that there was a high likelihood that a customer would make a purchase as a result of the customer interaction, but the customer didn't actually make a purchase, the agent would be assigned a negative interaction score. In block 306 of method 300, the interaction score may be utilized for agent evaluation and training purposes. For example, personalized feedback may be provided to the agent based on the interactions score. The interaction score may further be utilized to target underperforming agents and also to identify positive and negative interactions for use in training materials. In certain embodiments, a success rate of an agent may be calculated over an extended period covering a plurality of customer interactions conducted by the agent. In such an embodiment, a plurality of predicted identified outcomes may be compared against a plurality of respective actual outcomes to generate a plurality of interaction scores. The interaction scores may be aggregated to produce an overall interaction score that is either positive, negative, or neutral. A success rate of an agent may be based on the overall interaction score. Further, in some embodiments, interaction scores of multiple agents may be aggregated to generate group performance data, for example, related to all agents in a contact center, region, or company.

One of ordinary skill would recognize that the method 300 of training a contact center agent using customer interaction outcome prediction is simply an example embodiment, and, in alternative embodiments, additional and/or different steps may be included in the method and the actions performed in association with the blocks of the method may be performed in an alternative order.

Figure 7:
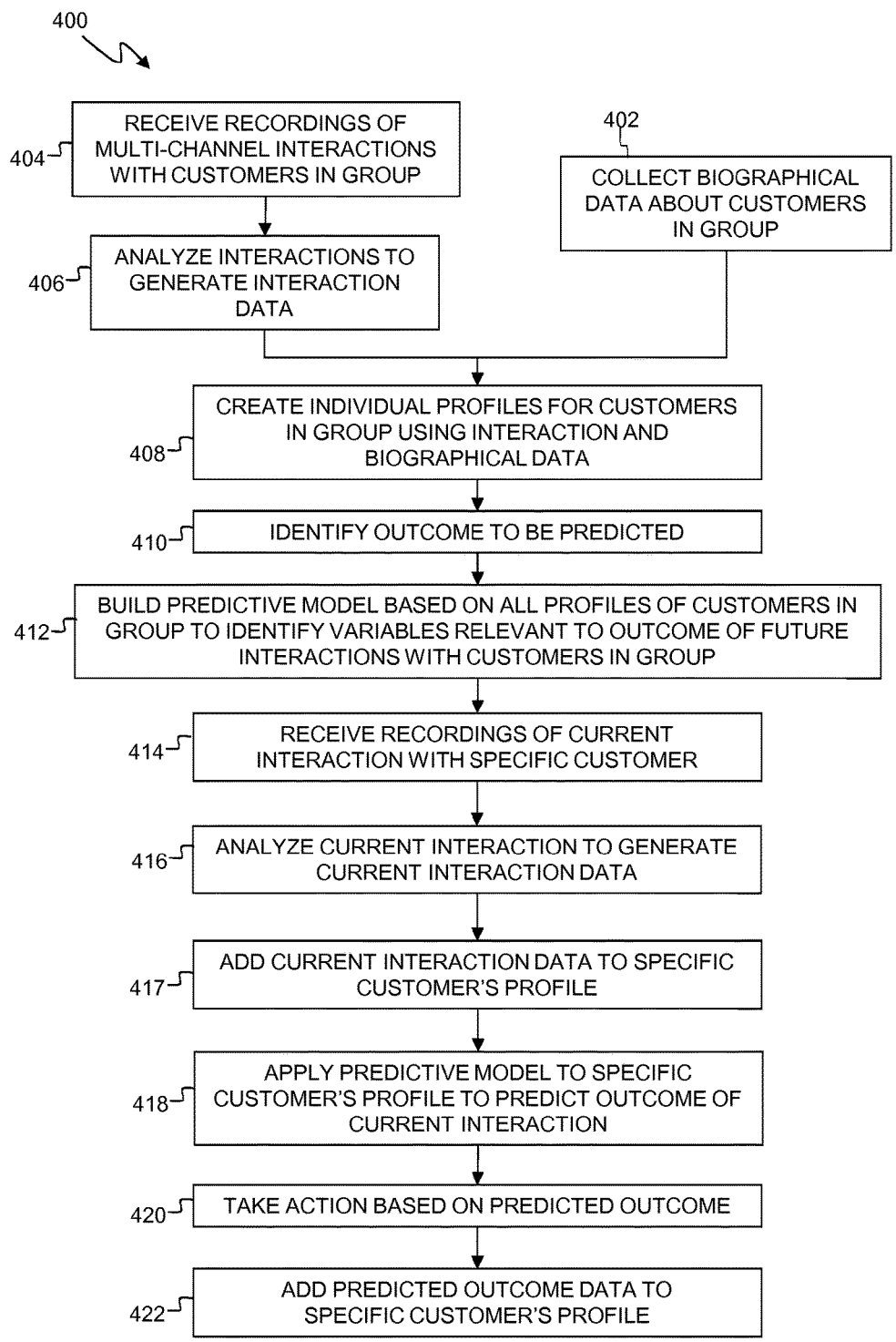
FIG. 7 is a high-level flowchart illustrating a method for customer-based interaction outcome prediction according to another embodiment of the present disclosure.

Referring now to FIG. 7, illustrated is a high-level flow-chart illustrating a method 400 for customer-based interaction outcome prediction according to another embodiment of the present disclosure. While other embodiments herein are more closely related to predicting the outcome of a customer interaction without regard to the specific customer involved in the interaction, the method 400 of FIG. 7 is a preferred embodiment directed that includes outcome prediction at the customer level. That is, behavioral, interaction, and biographical data collected about customers in an identifiable group may be aggregated and used to predict one or more outcomes occurring in the future with respect to a specific customer in the group. Such customer-centric outcome prediction methodology is believed, without being bound by theory, to enhance the accuracy of contact center predictions, thereby enhancing the effectiveness of any post-interaction actions with the customer. For example, predictive models build upon data associated with customers in a specific group may be more accurate with respect to group members than predictive models build upon data associated with all customers.

In the illustrated embodiment, at least a portion of the method 400 is carried out by the contact center control system 142 and/or the analytics system 160 of FIG. 2. Further, in one embodiment, portions of the method 400 may be implemented as computer-readable instructions stored on the mass storage device 148 or system memory 146 and executed by the processor 144 of the control system 142 and/or the analytics system 160 of FIG. 2.

The method 400 begins at blocks 402 and 404, where data about customers is collected, identified, gathered, and/or otherwise recorded. Specifically, in block 402, biographical and profile-type data is collected about customers in an identifiable customer group. The customer group may be inclusive of every customer associated with an entity or it may be exclusive to customers that fall within some customer subset identified by the entity. For example, a first customer group may include all customers of an insurance company, a second customer group may include only life insurance customers, and a third customer group may include only casualty insurance customers. In some embodiments, customer groups may overlap in membership. Further, in some embodiments, the customer biographical data may be received from another entity that actually collected the data, while in another embodiment the biographical data may have been provided by the customer directly or through another entity. The biographical profile data includes an identifier unique to the customer, which may include one or more of: customer name, a customer phone number, customer address, social security number, account/policy numbers, email address, Twitter handle, IM/chat/Skype account, or the like. The biographical profile data will also typically include one or more of the following: employment status, income, gender, age, demographic information (e.g., zip code, age range, etc.), credit history, customer "value" data (i.e., customer tenure, money spent as customer, etc.), customer risk classification, customer transaction history, and any other structured and/or unstructured data that identifies or helps describe a specific customer. In block 404, recordings of multi-channel interactions associated with the customers in the customer group are received. In some embodiments, the recordings may have been made by the contact center control system 142 and/or the analytics system 160, while in other embodiments the recordings may be received from another entity that facilitated the interactions. As mentioned above, these interactions may include telephone-based interactions, instant message interactions, social media interactions, website-based interactions, email exchanges, live chats, facsimile interactions, unilateral submissions of textual or video communications, and any other type of in-person or electronic interactions associated with the customers in the customer group. Recordings of the interactions may include audio recordings, transcriptions, message logs, text captures of written essays or other textual items, screen captures, analytics data generated from a captured interaction, and any other data associated with interaction with the customers in the customer group. In certain preferred embodiments, recordings are associated with a unique customer identifier and time-stamped for analysis purposes.

In block 406 of method 400, the interaction recordings are analyzed or otherwise processed to generate interaction data associated with the customers in the customer group. Interaction data can include structured logistical data and also unstructured data, such as behavioral data describing the customer. For example, structured telephony history data may include customer history data such as call length, call origination, hold time, transfer data, conferencing data, third-party connection data, reason for call, number and frequency of all previous calls from the customer, and average length and gross minutes of all calls associated with the customer. Internet-specific event data may include preferred medium data, email frequency data, and any other data related to past Internet-based communication by a customer. Unstructured data may include behavioral assessment data such as personality type (for example, as modeled with PCM), linguistic analysis data, data based on text analysis, detected distress event data, prediction data predicting the outcome of an interaction, actual outcome data, data from speech analytics, text analytics, desktop analytics, web analytics, email analytics, chat analytics, IVR analytics, and sentiment analytics. In other embodiments, interaction data may include additional and/or different data describing past interactions with the customers in the customer group.

The method 400 continues to block 408 where individual profiles for all customers in the customer group are created. Each customer profile contains all biographical data about a specific customer and also contains all interaction data associated with previous interactions with the customer. Each customer profile may be cumulative of all biographical and interaction data collected, recorded, and/or received about a customer and associated with such customer via a unique identifier. In other words, a customer profile aggregates interaction and biographical data at the customer level. A unique customer profile may be initially generated when a customer opens an account or interacts with an agent or otherwise communicates with an entity. As described herein, such aggregation of contact center data at the customer level improves future interaction outcome prediction.

The method 400 next proceeds to block 410 where an outcome associated with future interactions with, action, or response from customers in the customer group is identified as a target of a predictive model. For example, it may be useful for a company (which could include a sole proprietor) to predict, after or during the current or next interaction with a customer in the group, whether the customer will be satisfied as a result of the interaction, whether the customer will terminate his or her account, whether the customer will purchase a product, whether a customer will pay an outstanding bill, whether a customer is a fraudster, and whether a customer will initiate additional subsequent interaction sessions regarding the same issue, or a combination thereof. Additionally, the method 400 may be used to predict more specific outcomes associated with particular fields in which contact centers are commonly used or might be used. For example, the outcome identified in block 410 may be the likelihood a customer will apply for enrollment in a particular education institution, the likelihood a customer will recommend one of a specific service, company, and product to another customer, the likelihood a customer will cure collections debt, the likelihood a customer meets hiring or enrollment criteria, or the likelihood a customer accepts an offer. This is a non-exhaustive list and additional and/or different outcomes related to interactions with customers may be identified. Further, in some instances the method 400 is utilized to predict the likelihood that an identified outcome will not happen. For instance, the identified outcome may be a customer paying a bill on time.

Once an outcome to be predicted is identified, the method 400 proceeds to block 412 where a predictive model operable to predict the likelihood of the identified outcome occurring is built using all the data collected about the customers in the customer group. Specifically, in one embodiment, the data contained in all of the customer profiles of the customers in the group is aggregated and fed into predictive analytics software that creates a binary logistic regression model based on the input data. The regression model identifies the variables within the profile data that influence whether the identified outcome will occur or not in the context of a future interaction with customers in the customer group. That is, all available data associated with the customers in the group is used to "train" the predictive analytics software to identify tendencies, patterns, and trends specific to customers in the group. The variables identified as most relevant to the selected outcome to be predicted may be associated with both structured and unstructured interaction data and also biographical data. A regression coefficient may be assigned to each identified variable to establish the correlation and contribution of the variable to the predicted outcome. In certain embodiments, the predictive analytics software used in block 412 is IBM®

SPSS® Regression software, however, in other embodiments, the predictive analytics software may be another commercially available predictive analytics product or may be a proprietary program customized for contact center prediction scenarios, or a combination thereof. Further, in some embodiments, the data in the customer profiles may be benchmarked and standardized in the manner described in association with FIG. 3 before it is fed into the predictive analytics software.

The method 400 continues to block 414 where a recording of a current interaction involving a specific customer in the customer group is received. As mentioned above, the predictive model is used to determine the likelihood of the identified outcome occurring in association with the current interaction with the specific customer. In block 416, the recording of the current interaction is analyzed or otherwise examined to generate interaction data, including interaction data associated with the variables identified as relevant to predicting the identified outcome. As an example, if the customer's personality, the number of distress events during the interaction, the customer's tenure, and the zip code of the customer's residence are deemed relevant to the identified outcome of the customer canceling his or her service after the interaction, interaction data values corresponding with the customer's personality and the number of distress events are generated by the analysis of the interaction. In this regard, the control system 142 and/or the analytics system 160 may generate a transcript of the interaction and apply a linguistic-based behavior model to determine the personality of the customer and apply a distress identification technique to determine the number of stress events that occurred during the interaction. Further, data associated with the customer's tenure and zip code data may be retrieved from the customer's profile. Depending on the variables identified as relevant to predicting the identified outcome, any different and/or additional interaction data may be generated from the current customer interaction. Additionally, although the analysis of the current interaction may occur after the interaction terminates, as described above, in certain embodiments, the analysis and generation of interaction data may occur in real-time during the interaction itself. In such embodiments, receiving a recording of the current interaction may occur concurrently with the interaction, with no or some delay.

After the relevant interaction data has been generated from the current interaction in block 416, the method 400 continues to block 417 where the interaction data associated with the current interaction is added to the customer profile. In more detail, any interaction data such as personality data and distress event data that is generated from the recording of the current interaction is used to augment the data already in the customer profile. In some embodiments, the recording itself is added to the customer profile for later analysis.

The method 400 next proceeds to block 418 where the where the predictive model is applied to the specific customer's profile to calculate a likelihood that the identified outcome will occur in association with the current interaction with the specific customer. In more detail, each of the interaction and biographical data values within the customer's profile that were deemed relevant to the outcome is multiplied by its respective regression coefficient as determined by the predictive model, and the data values are summed. In one embodiment, the result is a prediction score between zero and one that indicates the likelihood (or probability) that the identified outcome will occur in association with the current interaction with the specific customer, with a score of one being arranged to represent a 100% probability that the outcome will occur. As mentioned above, in some embodiments, the interaction data values are applied to the predictive model to calculate the likelihood that the identified outcome will not occur in association with the identified customer. In the illustrated embodiment, the predictive result is calculated after the termination of the interaction, but, in alternative embodiments, the predictive result may be calculated during the course of the interaction with the specific customer, such as in near real-time. In this manner, a customer-specific prediction may be calculated with a model based on structured and unstructured past interaction data and also biographical data about customers in the same group as the specific customer, rather than on random interaction data associated customers unrelated to the specific customer. Additionally, in certain embodiments, the predictive analytics software may also recommend an appropriate follow-up action based on the predicted outcome, which might increase the likelihood of obtaining the predicted outcome. The follow-up action, in such a scenario, may be tailored specifically for the identified customer or customers in the customer group. In other embodiments, a desired agent can be matched to handle this customer, or to train an agent on how to deal with customers in such a situation, to increase the likelihood of a successful identified outcome, or both.

Next, in block 420, some action may be optionally taken based on the outcome prediction made in block 418. As an example, if the predictive results obtained in block 418 indicate that there is a high likelihood that the specific customer will terminate his or her service during or after the current interaction, some remedial action may be taken during or after the current interaction to prevent the customer from terminating. For example, the control system 142 and/or the analytics system 160 may send a signal to an agent to prompt the agent to take some specific action with regard to the customer. Additional example actions that may be taken in block 420 are discussed in association with FIG. 3. Finally, in block 422 of method 400, the predicted outcome data generated in block 418 may be added to the customer profile associated with the specific customer. In this manner, future prediction models that are generated from the customer profile may be based on all available interaction data available about a specific customer.

Because the outcome-prediction method 400 is customer-based, some or all of the blocks of the method may be repeated when predicting outcomes related to different customers in the same customer group. For instance, after predicting an outcome of an interaction with a first customer in the customer group, a contact center may repeat at least some of the method steps above for a second, different customer in the customer group. For example, after a current interaction with the second customer, newly generated interaction data may be added to the second customer's profile and the predictive model associated within the customer group may be applied to the second customer's profile to make a prediction about the actions of the second customer. Alternatively or additionally, some or all of the blocks may be repeated when predicting outcomes related to the additional customers in the customer group. In this circumstance, the profiles of the customers in the group are iteratively updated with additional information from one or more interactions and additional predictive models may be built. Such additional models may produce more and more accurate predictions with respect to members of the customer group.

It is understood that the method 400 for customer-based interaction outcome prediction is simply an example embodiment, and, in alternative embodiments, additional and/or different steps may be included in the method and the actions performed in association with the blocks of the method may be performed in an alternative order. For example, in one embodiment, customer profile data may be standardized and benchmarked so as to provide uniform and relevant input to the prediction model software. Further, the customer-based interaction outcome prediction may be used to route an incoming communication from customers in the customer group to a specific agent based on a likelihood the customers will be satisfied with the particular agent. Additional details about agent routing are discussed in association with FIG. 4.

The present disclosure encompasses a first embodiment related to a method for real-time customer interaction outcome prediction, which includes identifying input data from one or more interaction data channels collected during at least one previous customer interaction, standardizing the input data, building a predictive model using the standardized input data, the predictive model identifying a variable relevant to predicting an identified interaction outcome, collecting a real-time data value associated with the variable during a current customer interaction, standardizing the real-time data value using a selected benchmark data set that is a subset of the input data and includes previously-collected data values associated with the variable, and applying the standardized real-time data value to the predictive model to predict a likelihood of the identified interaction outcome occurring in association with the current customer interaction session.

In one embodiment, standardizing the real-time data value includes converting the real-time data value to a dimensionless numerical value that represents a deviation of the real-time data value from an average of previously-collected data values in the benchmark data set. In a preferred embodiment, the dimensionless numerical value is a standard score that represents the number of standard deviations the real-time data value is above or below the average of the previously-collected data values in the benchmark data set. In another embodiment, the benchmark data set includes fewer than all of the previously-collected data values associated with the variable in the input data. In a preferred embodiment, the benchmark data set includes only those previously-collected data values associated with the variable in the input data that were collected in association with customer interactions occurring during a limited time range.

In another embodiment, the input data includes behavioral assessment data generated by applying a linguistic-based behavioral algorithm to unstructured data recorded during the at least one previous customer interaction. In a preferred embodiment, the behavioral assessment data includes personality type data. In a different embodiment, the input data includes distress event data generated by applying a distress analysis algorithm to unstructured interaction data recorded during the at least one previous customer interaction. In yet a further embodiment, the input data includes one of structured customer profile data and structured agent profile data. In another embodiment, the at least one previous customer interaction was one of a telephone-based interaction, an instant message interaction, a social media interaction, a website-based interaction, an email exchange interaction, and a facsimile-based interaction.

In one embodiment, building the predictive model includes inputting the standardized input data into predictive analytics software to create a binary logistic regression model based on the input data. In a preferred embodiment, building the predictive model further includes assigning a regression coefficient to the variable. In a more preferred embodiment, applying the standardized real-time data value to the predictive model includes multiplying the standardized real-time data value by the regression coefficient to get a prediction score. In yet another embodiment, applying the standardized real-time data value to the predictive model is performed during the course of the current customer interaction. In a further embodiment, the method further includes converting the likelihood of the identified interaction outcome occurring into a binary prediction.

In another embodiment, the method further includes performing a remedial action to influence the identified interaction outcome based on the predicted likelihood of the identified interaction outcome occurring. In yet another embodiment, the method further includes repeatedly performing remedial actions during the current customer interaction, and predicting the likelihood of the identified interaction outcome occurring until a prediction score is within a pre-selected threshold. In yet a further embodiment, the variable relevant to predicting an identified interaction outcome is selected to represent a characteristic associated with a contact center agent, and the method further includes determining which agent out of a plurality of available contact center agents should conduct the current customer interaction.

In a second aspect, the disclosure encompasses a real-time customer interaction outcome prediction system, which includes a control system including a processor and a computer-readable medium operably coupled thereto, the computer-readable medium including a plurality of instructions stored therein that are accessible to, and executable by the processor, wherein the plurality of instructions includes: instructions, that when executed, standardize input data from one or more interaction data channels collected during at least one previous customer interaction, instructions, that when executed, build a predictive model using the standardized input data, the predictive model identifying one or more variables relevant to predicting an identified interaction outcome, instructions, that when executed, collect a real-time data value associated with each variable during a current customer interaction session, instructions, that when executed, standardize the real-time data value using a selected benchmark data set that is a subset of the input data and includes previously-collected data values associated with each variable, and instructions, that when executed, apply the standardized real-time data value to the predictive model to predict a likelihood of the identified interaction outcome occurring in association with the current customer interaction session.

In one embodiment, the instructions, that when executed, standardize input data include instructions to convert the real-time data value to a dimensionless numerical value that represents a deviation of the real-time data value from an average of previously-collected data values in the benchmark data set. In a preferred embodiment, the dimensionless numerical value is a standard score that represents the number of standard deviations the real-time data value is above or below the average of the previously-collected data values in the benchmark data set. In another embodiment, the benchmark data set includes fewer than all of the previously-collected data values associated with the variable in the input data. In a preferred embodiment, the benchmark data set includes only those previously-collected data values associated with the variable in the input data that were collected in association with customer interactions occurring during a limited time range. In another embodiment, the input data includes behavioral assessment data generated by applying a linguistic-based behavioral algorithm to unstructured data recorded during the at least one previous customer interaction. In a preferred embodiment, the behavioral assessment data includes personality type data.

In a further embodiment, the input data includes distress event data generated by applying a distress analysis algorithm to unstructured interaction data recorded during the at least one previous customer interaction. In yet another embodiment, the input data includes one of structured customer data and structured agent data. In another embodiment, the at least one previous customer interaction was one of a telephone-based interaction, an instant message interaction, a social media interaction, a website-based interaction, an email exchange interaction, and a facsimile-based interaction. In yet a further embodiment, the instructions, that when executed, build a predictive model include instructions to create a binary logistic regression model based on the standardized input data. In a preferred embodiment, the instructions, that when executed, build a predictive model further include instructions to assign a regression coefficient to the variable. In a more preferred embodiment, the instructions, that when executed, apply the standardized real-time data value to the predictive model include instructions to multiply the standardized real-time data value by the regression coefficient to get a prediction score.

In one embodiment, the instructions, that when executed, apply the standardized real-time data value to the predictive model are executed during the course of the current customer interaction. In another embodiment, the system further includes instructions, that when executed, convert the likelihood of the identified interaction outcome occurring into a binary prediction. In yet another embodiment, the system further includes instructions, that when executed, perform a remedial action to influence the identified interaction outcome based on the predicted likelihood of the identified interaction outcome occurring.

In a third aspect, the disclosure encompasses a method of interacting with a customer during a current customer interaction, which includes: identifying input data including unstructured interaction data collected during at least one previous customer interaction with the customer, applying a linguistic-based behavioral model to the unstructured interaction data to generate behavioral assessment data, standardizing the behavioral assessment data, building a predictive model using the behavioral assessment data, the predictive model identifying a variable relevant to predicting an identified interaction outcome, selecting a first benchmark data set for the variable, the first benchmark data set being a subset of the input data and including previously-collected data values associated with the variable, and during the current customer interaction with the customer: gathering a real-time data value associated with variable, standardizing the real-time data value using the first benchmark data set, and applying the standardized real-time data value to the predictive model to generate a prediction score indicative of a likelihood of the identified interaction outcome occurring in association with the current customer interaction; comparing the prediction score against a pre-selected threshold, and performing a remedial action to influence the identified interaction outcome if the prediction score is outside of the pre-selected threshold.

In one embodiment, the method further includes, after performing the remedial action, gathering an updated real-time data value associated with variable, standardizing the updated real-time data value using the first benchmark data set, applying the standardized updated real-time data value to the predictive model to generate an updated prediction score, comparing the updated prediction score against the pre-selected threshold, and performing a further remedial action to influence the identified interaction outcome if the prediction score is outside of the pre-selected threshold. In another embodiment, standardizing the behavioral assessment data is performed using a second benchmark data set that is different than the first benchmark data set. In yet a further embodiment, standardizing the real-time data value includes converting the real-time data value to a dimensionless numerical value that represents a deviation of the real-time data value from an average of previously-collected data values in the benchmark data set. In a preferred embodiment, the dimensionless numerical value is a standard score that represents the number of standard deviations the real-time data value is above or below the average of the previously-collected data values in the benchmark data set.

In another embodiment, the benchmark data set includes fewer than all of the previously-collected data values associated with the variable in the input data. In a preferred embodiment, the benchmark data set includes only those previously-collected data values associated with the variable in the input data that were collected in association with customer interactions occurring during a limited time range. In another embodiment, the behavioral assessment data includes personality type data. In a further embodiment, the input data includes distress event data generated by applying a distress analysis algorithm to the unstructured interaction data. In yet another embodiment, the input data includes one of structured customer profile data and structured agent profile data. In yet another embodiment, the at least one previous customer interaction was one of a telephone-based interaction, an instant message interaction, a social media interaction, a website-based interaction, an email exchange interaction, and a facsimile-based interaction. In another embodiment, building the predictive model includes inputting the standardized behavioral assessment data into predictive analytics software to create a binary logistic regression model. In a preferred embodiment, building the predictive model further includes assigning a regression coefficient to the variable. In a more preferred embodiment, applying the standardized real-time data value to the predictive model includes multiplying the standardized real-time data value by the regression coefficient to get the prediction score. In another embodiment, the pre-selected threshold includes a plurality of threshold levels.

In a fourth aspect, the disclosure encompasses a method of evaluating a contact center agent, which includes identifying input data from one or more interaction data channels collected during at least one previous customer interaction, standardizing the input data, building a predictive model using the standardized input data, the predictive model identifying a variable relevant to predicting an identified interaction outcome, collecting a real-time data value associated with the variable during a current customer interaction between the contact center agent and a customer, standardizing the real-time data value using a selected benchmark data set that is a subset of the input data and includes previously-collected data values associated with the variable, and applying the standardized real-time data value to the predictive model to predict a likelihood of the identified interaction outcome occurring in association with the current customer interaction session, measuring an actual interaction outcome associated with the current customer interaction, comparing the actual interaction outcome to the predicted likelihood of the identified interaction outcome occurring to calculate an interaction score for the contact center agent, and utilizing the interaction score to evaluate the contact center agent.

In one embodiment, the interaction score is aggregated with a plurality of past interaction scores for the contact center agent to calculate a success rate for the contact center agent. In a preferred embodiment, the success rate for the contact center agent is aggregated with a plurality of success rates for a plurality of contact center agents to calculate a group success rate for the plurality of contact center agents. In another embodiment, using the interaction score includes providing feedback based on at least the interaction score to the contact center agent. In a further embodiment, measuring an actual interaction outcome includes recording one of whether the customer made a purchase, whether the customer terminated a service, and whether the customer was satisfied with a resolution of the interaction. In yet another embodiment, standardizing the real-time data value includes converting the real-time data value to a dimensionless numerical value that represents a deviation of the real-time data value from an average of previously-collected data values in the benchmark data set. In yet another embodiment, the benchmark data set includes fewer than all of the previously-collected data values associated with the variable in the input data. In a preferred embodiment, the benchmark data set includes only those previously-collected data values associated with the variable in the input data that were collected in association with customer interactions occurring during a limited time range. In yet another embodiment, the input data includes behavioral assessment data generated by applying a linguistic-based behavioral algorithm to unstructured data recorded during the at least one previous customer interaction. In another embodiment, the at least one previous customer interaction was one of a telephone-based interaction, an instant message interaction, a social media interaction, a website-based interaction, an email exchange interaction, and a facsimile-based interaction.

In other embodiments, the disclosure encompasses methods and systems that aggregate information at the customer level to help build the predictive model, and apply the model to a particular application. In one embodiment, the disclosure includes a method for real-time customer interaction outcome prediction that includes: selecting a targeted data set from multi-channel interaction data collected during at least one previous customer interaction, the targeted data set being a subset of the multi-channel interaction data; building, using predictive analytics software executing on a control system, a predictive model using the targeted data set, the predictive model identifying a variable relevant to predicting a likelihood a customer will apply for enrollment to a specific education institution; collecting a real-time data value associated with the variable during a current customer interaction with a current customer; and applying the real-time data value to the predictive model to predict the likelihood the current customer will apply for enrollment to the specific education institution in association with the current customer interaction.

In another embodiment, the disclosure encompasses a method and system for real-time customer interaction outcome prediction, which comprises: selecting a targeted data set from multi-channel interaction data collected during at least one previous customer interaction, the targeted data set being a subset of the multi-channel interaction data; building, using predictive analytics software executing on a control system, a predictive model using the targeted data set, the predictive model identifying a variable relevant to predicting a likelihood a customer will recommend one of a specific service, company, and product to another; collecting a real-time data value associated with the variable during a current customer interaction with a current customer; and applying the real-time data value to the predictive model to predict the likelihood the current customer will recommend one of the specific service, company, and product to another in association with the current customer interaction.

In another embodiment, the disclosure encompasses a method and system for real-time customer interaction outcome prediction, which includes: selecting a targeted data set from multi-channel interaction data collected during at least one previous customer interaction, the targeted data set being a subset of the multi-channel interaction data; building, using predictive analytics software executing on a control system, a predictive model using the targeted data set, the predictive model identifying a variable relevant to predicting a likelihood a customer is engaged in fraudulent activity; collecting a real-time data value associated with the variable during a current customer interaction with a current customer; and applying the real-time data value to the predictive model to predict the likelihood the current customer is engaged in fraudulent activity in association with the current customer interaction.

In another embodiment, the disclosure encompasses a method and system for real-time customer interaction outcome prediction, which includes: selecting a targeted data set from multi-channel interaction data collected during at least one previous customer interaction, the targeted data set being a subset of the multi-channel interaction data; building, using predictive analytics software executing on a control system, a predictive model using the targeted data set, the predictive model identifying a variable relevant to predicting a likelihood a customer will cure collections debt; collecting a real-time data value associated with the variable during a current customer interaction with a current customer; and applying the real-time data value to the predictive model to predict the likelihood the current customer will cure collections debt in association with the current customer interaction.

In a further embodiment, the disclosure encompasses a method and system includes a control system. In this embodiment, the method and system for real-time customer interaction outcome prediction includes: identifying input data from one or more interaction data channels collected during at least one previous customer interaction; standardizing the input data; building, using predictive analytics software executing on a control system, a predictive model using the standardized input data, the predictive model identifying a variable relevant to predicting an identified interaction outcome; collecting a real-time data value associated with the variable during a current customer interaction; standardizing the real-time data value using a selected benchmark data set that is a subset of the input data and includes previously-collected data values associated with the variable; and applying the standardized real-time data value to the predictive model to predict a likelihood of the identified interaction outcome occurring in association with the current customer interaction.

The foregoing outlines features of several embodiments so that a person of ordinary skill in the art may better understand the aspects of the present disclosure. Such features may be replaced by any one of numerous equivalent alternatives, only some of which are disclosed herein. One of ordinary skill in the art should appreciate that they may readily use the present disclosure as a basis for designing or modifying other processes and structures for carrying out the same purposes and/or achieving the same advantages of the embodiments introduced herein. One of ordinary skill in the art should also realize that such equivalent constructions do not depart from the spirit and scope of the present disclosure, and that they may make various changes, substitutions and alterations herein without departing from the spirit and scope of the present disclosure.

The Abstract at the end of this disclosure is provided to comply with 37 C.F.R. § 1.72(b) to allow the reader to quickly ascertain the nature of the technical disclosure. It is submitted with the understanding that it will not be used to interpret or limit the scope or meaning of the claims.

What is claimed is:

1. A method of selecting an agent for a current customer interaction, which comprises:
   receiving, by one or more processors, multi-channel communication data and customer biographical data, wherein the multi-channel communication data comprises communications between an agent and a customer, including the current customer interaction and at least social media data;
   identifying, by the one or more processors, the customer;
   identifying, by the one or more processors, a desired outcome associated with the current customer interaction;
   determining, by the one or more processors, that the desired outcome is associated with agent data including agent personality type;
   in response to the determination that the desired outcome is associated with agent data, identifying, by the one or more processors, one or more available agents;
   applying, by the one or more processors, a linguistic-based psychological behavioral model to transcribed text of the current customer interaction to determine the personality type of each available agent;
   generating, by the one or more processors, a plurality of prediction scores, each prediction score associated with each available agent and based at least in part on the customer biographical data and the multi-channel communication data;
   establishing, by the one or more processors, a threshold score for the plurality of prediction scores, wherein the threshold score is a minimum score needed for the desired outcome to occur;
   comparing, by the one or more processors, the threshold score to each of the plurality of prediction scores;
   selecting, by the one or more processors, agents associated with a prediction score that exceed the threshold score;
   routing, by an Internet Protocol Private Branch Exchange (IP/PBX), the current customer interaction to an available agent associated with the highest prediction score from the plurality of generated prediction scores; and
   connecting, by the IP/PBX, the current customer interaction to the available agent associated with the highest prediction score.

2. The method of claim 1, wherein the customer biographical data comprises one or more of a customer phone number, social security number, account/policy number, address, email address, Twitter handle, social media account, employment status, income, gender, age, demographic information, credit history, customer value data, customer risk classification, customer transaction history.

3. The method of claim 2, wherein the agent data further comprises agent training level.

4. The method of claim 2, further comprising applying algorithms to the multi-channel communication data, customer biographical data, agent data, or any combination thereof, to derive behavioral assessment information about each customer and agent.

5. The method of claim 4, wherein the behavioral assessment information comprises customer personality type, distress events, or any combination thereof.

6. The method of claim 1, further comprising displaying the prediction scores to their respective agents.

7. The method of claim 1, further comprising collecting data from the current customer interaction.

8. The method of claim 7, further comprising applying algorithms to the data to determine values for a variable relevant to the identified outcome.

9. An agent selection system configured to select a desired agent to handle a current customer interaction, which comprises:
   an analytics system comprising a processor and a non-transitory computer-readable medium operably coupled thereto, the non-transitory computer-readable medium comprising a plurality of instructions stored therein that are accessible to, and executable by the processor, wherein the plurality of instructions comprises:
   instructions that, when executed, collect past customer interaction data, wherein the past customer interaction data comprises multi-channel communication data and customer biographical data, wherein the multi-channel communication data comprises communications between an agent and a customer, including at least social media data;
   instructions that, when executed, receive the current customer interaction;
   instructions that, when executed, determine that a desired outcome is associated with agent data including agent personality type;
   instructions that, when executed, analyze agent data associated with the current customer interaction in response to the determination that the desired outcome is associated with agent data;
   instructions that, when executed, apply a linguistic-based psychological behavioral model to transcribed text of the current customer interaction to determine the personality type of each available agent;
   instructions that, when executed, calculate a plurality of prediction scores with the predictive model, each prediction score associated with an available agent from a plurality of available agents and based at least in part on the past customer interaction data;
   instructions that, when executed, establish a threshold score for the plurality of prediction scores, wherein the threshold score is a minimum score needed for the desired outcome to occur;
   instructions that, when executed, compare the threshold score to each of the plurality of prediction scores;
   instructions that, when executed, select agents associated with a prediction score that exceed the threshold score;
   instructions that, when executed, route the current customer interaction to an available agent associated with the highest prediction score from the plurality of calculated prediction scores; and
   instructions that, when executed, connect the current customer interaction to the available agent associated with the highest prediction score.

10. The agent selection system of claim 9, wherein the customer biographical data comprises one or more of a customer phone number, social security number, account/policy number, address, email address, Twitter handle, social media account, employment status, income, gender, age, demographic information, credit history, customer value data, customer risk classification, customer transaction history.

11. The agent selection system of claim 10, wherein the agent data further comprises agent training level.

12. The agent selection system of claim 10, further comprising instructions that, when executed, apply algorithms to the multi-channel communication data, customer biographical data, agent data, or any combination thereof to derive behavioral assessment information about each customer and agent.

13. The agent selection system of claim 12, wherein the behavioral assessment information comprises customer personality type, distress events, or any combination thereof.

14. The agent selection system of claim 9, further comprising instructions that, when executed, collect data from the current customer interaction.

15. The agent selection system of claim 14, further comprising instructions that, when executed, apply algorithms to the data to determine values for a variable relevant to the desired outcome.

16. A non-transitory machine-readable medium configured to select an agent comprising instructions which, in response to a computer system, cause the computer system to perform a method which comprises:
  receiving multi-channel communication data and customer biographical data, wherein the multi-channel communication data comprises communications between an agent and a customer, including a current customer interaction and at least social media data;
  in response to determining that agent data is a variable relevant to predicting the likelihood of the desired outcome occurring, calculating a plurality of prediction scores based on a predictive model, each prediction score associated with an available agent from a plurality of available agents and being based at least in part on the multi-channel communication data and the customer biographical data;
  establishing a threshold score for the plurality of prediction scores, wherein the threshold score is a minimum score needed for the desired outcome to occur;
  comparing the threshold score to each of the plurality of prediction scores;
  selecting agents associated with a prediction score that exceed the threshold score;
  routing the current customer interaction to an available agent associated with the highest prediction score from the plurality of calculated prediction scores; and
  connecting the current customer interaction to the available agent associated with the highest prediction score.

17. The non-transitory machine-readable medium of claim 16, wherein the method further comprises applying algorithms to the customer biographical data and the multi-channel communication data to derive behavioral assessment information about customers and agents.

18. The non-transitory machine-readable medium of claim 17, wherein the behavioral assessment information comprises personality type, distress events, or any combination thereof.

19. The non-transitory machine-readable medium of claim 16, wherein the method further comprises determining other variables relevant to predicting the likelihood of the desired outcome occurring.

* * * * *